United States Patent
Goda et al.

(10) Patent No.: US 12,524,338 B2
(45) Date of Patent: Jan. 13, 2026

(54) APPARATUS AND METHODS FOR PROGRAMMING DATA STATES OF MEMORY CELLS

(71) Applicant: MICRON TECHNOLOGY, INC., Boise, ID (US)

(72) Inventors: Akira Goda, Tokyo (JP); Koichi Kawai, Yokohama (JP); Huai-Yuan Tseng, San Ramon, CA (US); Yoshihiko Kamata, Yokohama (JP)

(73) Assignee: Micron Technology, Inc., Boise, ID (US)

( * ) Notice: Subject to any disclaimer, the term of this patent is extended or adjusted under 35 U.S.C. 154(b) by 128 days.

(21) Appl. No.: 18/595,703

(22) Filed: Mar. 5, 2024

(65) Prior Publication Data
US 2024/0320144 A1 Sep. 26, 2024

Related U.S. Application Data

(60) Provisional application No. 63/453,564, filed on Mar. 21, 2023.

(51) Int. Cl.
*G11C 16/10* (2006.01)
*G06F 12/02* (2006.01)

(52) U.S. Cl.
CPC ................... *G06F 12/0246* (2013.01)

(58) Field of Classification Search
CPC .................................................... G06F 12/024
See application file for complete search history.

(56) References Cited

U.S. PATENT DOCUMENTS

| | | | |
|---|---|---|---|
| 9,396,791 B2 | 7/2016 | Raghunathan et al. | |
| 10,741,252 B2 | 8/2020 | Lee | |
| 11,562,791 B1* | 1/2023 | Nguyen | G11C 16/24 |
| 2007/0014161 A1* | 1/2007 | Li | G11C 11/5642 |
| | | | 365/185.25 |
| 2007/0159888 A1* | 7/2007 | Tu | G11C 16/12 |
| | | | 365/185.21 |
| 2011/0080789 A1 | 4/2011 | Kalavade et al. | |
| 2022/0044726 A1* | 2/2022 | Huang | G11C 16/10 |
| 2022/0208288 A1 | 6/2022 | Sharma | |
| 2022/0328114 A1* | 10/2022 | Chai | G11C 7/1039 |
| 2024/0071507 A1 | 2/2024 | Kawai et al. | |

* cited by examiner

*Primary Examiner* — Min Huang
(74) *Attorney, Agent, or Firm* — Dicke, Billig & Czaja, PLLC

(57) ABSTRACT

Memories might include a controller configured to cause the memory to apply a programming pulse to a memory cell, perform an analog verify phase on the memory cell, in response to the analog verify phase, apply a first voltage level to a corresponding data line of the memory cell that is selected from a group consisting of an inhibit voltage level, a full enable voltage level, and an analog enable voltage level, apply a subsequent programming pulse to the memory cell, perform a digital verify phase on the memory cell, in response to the digital verify phase, apply a second voltage level to the corresponding data line of the memory cell that is selected from a group consisting of the inhibit voltage level and a digital enable voltage level, and apply a next subsequent programming pulse to the memory cell.

20 Claims, 15 Drawing Sheets

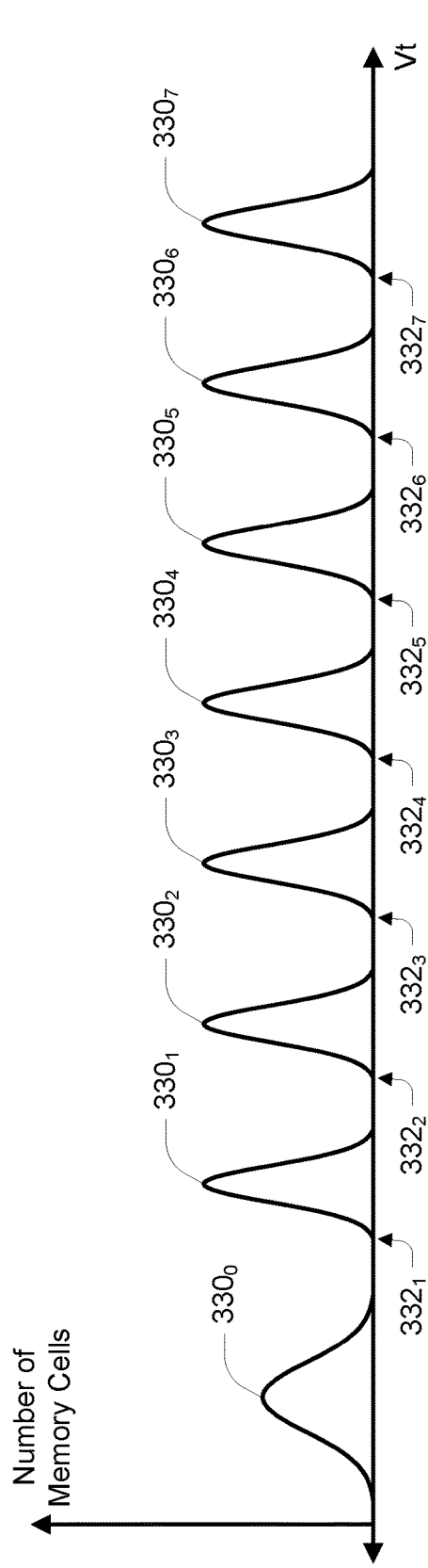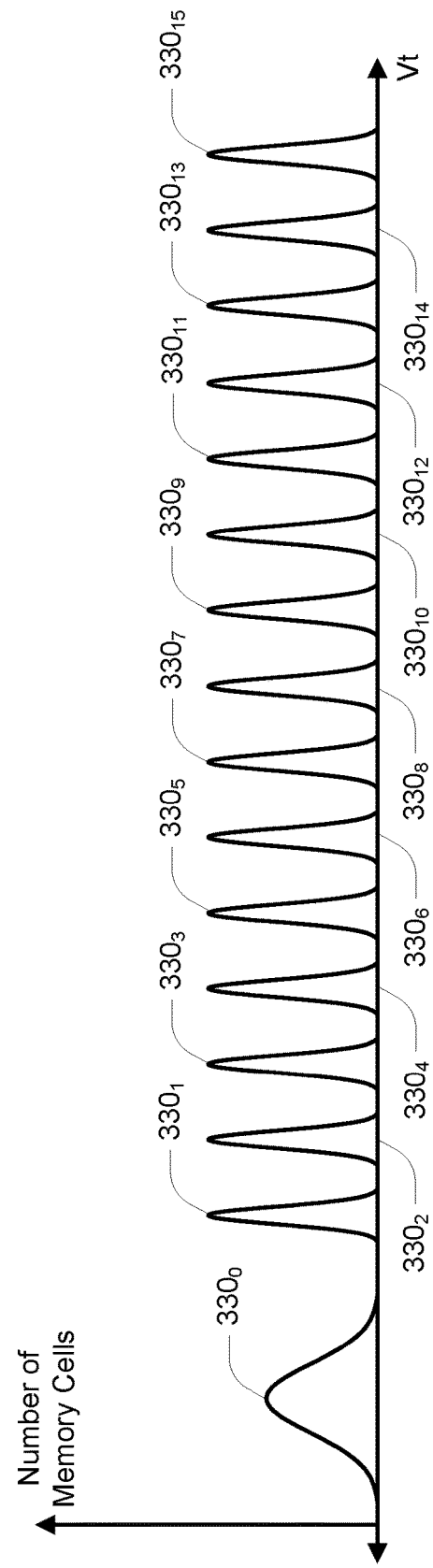

APPARATUS AND METHODS FOR PROGRAMMING DATA STATES OF MEMORY CELLS

RELATED APPLICATION

This application claims the benefit of U.S. Provisional Application No. 63/453,564, filed on Mar. 21, 2023, hereby incorporated herein in its entirety by reference.

TECHNICAL FIELD

The present disclosure relates generally to memory and, in particular, in one or more embodiments, the present disclosure relates to apparatus and methods for programming data states of memory cells.

BACKGROUND

Memories (e.g., memory devices) are typically provided as internal, semiconductor, integrated circuit devices in computers or other electronic devices. There are many different types of memory including random-access memory (RAM), read only memory (ROM), dynamic random access memory (DRAM), synchronous dynamic random access memory (SDRAM), and flash memory.

Flash memory has developed into a popular source of non-volatile memory for a wide range of electronic applications. Flash memory typically use a one-transistor memory cell that allows for high memory densities, high reliability, and low power consumption. Changes in threshold voltage (Vt) of the memory cells, through programming (which is often referred to as writing) of charge storage structures (e.g., floating gates or charge traps) or other physical phenomena (e.g., phase change or polarization), determine the data state (e.g., data value) of each memory cell. Common uses for flash memory and other non-volatile memory include personal computers, personal digital assistants (PDAs), digital cameras, digital media players, digital recorders, games, appliances, vehicles, wireless devices, mobile telephones, and removable memory modules, and the uses for non-volatile memory continue to expand.

A NAND flash memory is a common type of flash memory device, so called for the logical form in which the basic memory cell configuration is arranged. Typically, the array of memory cells for NAND flash memory is arranged such that the control gate of each memory cell of a row of the array is connected together to form an access line, such as a word line. Columns of the array include strings (often termed NAND strings) of memory cells connected together in series between a pair of select gates, e.g., a source select transistor and a drain select transistor. Each source select transistor might be connected to a source, while each drain select transistor might be connected to a data line, such as column bit line. Variations using more than one select gate between a string of memory cells and the source, and/or between the string of memory cells and the data line, are known.

In programming memory, memory cells might be programmed as what are often termed single-level cells (SLC). SLC might use a single memory cell to represent one digit (e.g., one bit) of data. For example, in SLC, a Vt of 2.5V or higher might indicate a programmed memory cell (e.g., representing a logical 0) while a Vt of −0.5V or lower might indicate an erased memory cell (e.g., representing a logical 1). Such memory might achieve higher levels of storage capacity by including multi-level cells (MLC), triple-level cells (TLC), quad-level cells (QLC), etc., or combinations thereof in which the memory cell has multiple levels that enable more digits of data to be stored in each memory cell. For example, MLC might be configured to store two digits of data per memory cell represented by four Vt ranges, TLC might be configured to store three digits of data per memory cell represented by eight Vt ranges, QLC might be configured to store four digits of data per memory cell represented by sixteen Vt ranges, and so on.

BRIEF DESCRIPTION OF THE DRAWINGS

FIGS. 3A-3B are conceptual depictions of threshold voltage distributions of a plurality of memory cells of different memory densities.

DETAILED DESCRIPTION

Figure 1:
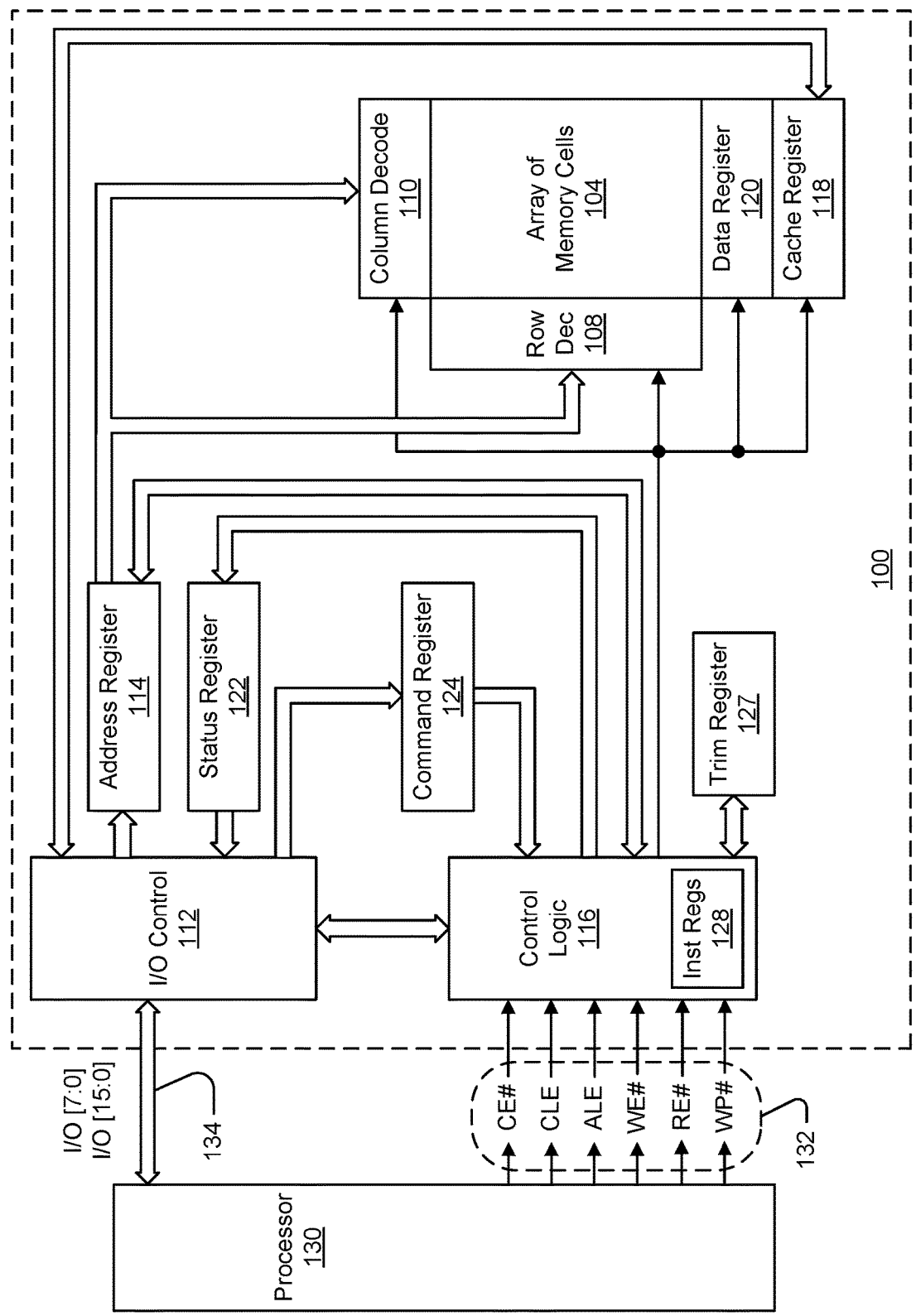
FIG. 1 is a simplified block diagram of a memory in communication with a processor as part of an electronic system, according to an embodiment.

In the following detailed description, reference is made to the accompanying drawings that form a part hereof, and in which is shown, by way of illustration, specific embodiments. In the drawings, like reference numerals describe substantially similar components throughout the several views. Other embodiments might be utilized and structural, logical and electrical changes might be made without departing from the scope of the present disclosure. The following detailed description is, therefore, not to be taken in a limiting sense.

The term "semiconductor" used herein can refer to, for example, a layer of material, a wafer, or a substrate, and includes any base semiconductor structure. "Semiconductor" is to be understood as including silicon-on-sapphire (SOS) technology, silicon-on-insulator (SOI) technology, thin film transistor (TFT) technology, doped and undoped semiconductors, epitaxial layers of a silicon supported by a base semiconductor structure, as well as other semiconductor structures well known to one skilled in the art. Furthermore, when reference is made to a semiconductor in the following description, previous process steps might have been utilized to form regions/junctions in the base semiconductor structure, and the term semiconductor can include the underlying layers containing such regions/junctions.

The term "conductive" as used herein, as well as its various related forms, e.g., conduct, conductively, conducting, conduction, conductivity, etc., refers to electrically conductive unless otherwise apparent from the context. Similarly, the term "connecting" as used herein, as well as its various related forms, e.g., connect, connected, connection, etc., refers to electrically connecting by an electrically conductive path unless otherwise apparent from the context.

It is recognized herein that even where values might be intended to be equal, variabilities and accuracies of industrial processing and operation might lead to differences from their intended values. These variabilities and accuracies will generally be dependent upon the technology utilized in fabrication and operation of the integrated circuit device. As such, if values are intended to be equal, those values are deemed to be equal regardless of their resulting values.

Programming in memories is typically accomplished by applying one or more programming pulses, separated by verify pulses, to program each memory cell of a selected group of memory cells to a respective target data state (which might be an interim or final data state). With such a scheme, the programming pulses are applied to access lines, such as those typically referred to as word lines, for selected memory cells. After each programming pulse, one or more verify voltage levels are typically used to verify the programming of the selected memory cells. Programming typically uses many programming pulses in an incremental step pulse programming (ISPP) scheme, where each programming pulse is a single-level pulse that moves the memory cell threshold voltage by some amount.

The programming pulses might be applied to a selected access line (e.g., word line) and thus to the control gates of the row of memory cells connected to the selected access line (e.g., having their control gates connected to the selected access line). Typical programming pulses might start at or near 13V and tend to increase in magnitude for each subsequent programming pulse application. While the program potential (e.g., voltage level of the programming pulse) is applied to the selected access line, an enable voltage, such as a reference potential (e.g., 0V), might be applied to the channels of memory cells selected for programming, i.e., those memory cells for which the programming operation is intended to shift their data state to some higher level. This might result in a charge transfer from the channel to the charge storage structures of these selected memory cells. For example, floating gates are typically charged through direct injection or Fowler-Nordheim tunneling of electrons from the channel to the floating gate, resulting in an increased threshold voltage in a programmed state.

An inhibit voltage level (e.g., Vcc) is typically applied to data lines which are selectively connected to a NAND string containing a memory cell that is connected to the selected access line and is not selected for, or is no longer selected for, programming. In addition to data lines selectively connected to memory cells already at their target data state, these unselected data lines might further include data lines that are not addressed by the programming operation. For example, a logical page of data might correspond to memory cells connected to a particular access line and selectively connected to some particular subset of the data lines (e.g., every other data line), such that the remaining subset of data lines would be unselected for the programming operation and thus inhibited.

Between the application of one or more programming pulses, a verify phase of the programming operation is typically performed to check each selected memory cell to determine if it has reached its target data state. If a selected memory cell has reached its target data state, it might be inhibited from further programming if there remain other selected memory cells still requiring additional programming pulses to reach their target data states. Following a verify phase, an additional programming pulse might be applied if there are memory cells that have not completed programming. This process of applying a programming pulse followed by verification (e.g., a programming phase and a verify, or sensing, phase of a programming operation) typically continues until all the selected memory cells have reached their target data states. If a particular number of programming pulses (e.g., maximum number) have been applied, or a particular voltage level of a programming pulse (e.g., maximum voltage level) has been reached, and one or more selected memory cells still have not completed programming, those memory cells might be marked as defective, for example.

The use of different voltage levels on data lines to be enabled for programming might occur in programming schemes known as selective slow programming convergence (SSPC), where memory cells nearer to their respective target data states are programmed more slowly (e.g., partially enabled for programming) compared to memory cells farther from their respective target data states (e.g., fully enabled for programming) while receiving a same voltage level at their respective control gates. SSPC programming schemes can facilitate more narrow distributions of threshold voltages defining each data state over more traditional programming schemes that rely on memory cells being either fully enabled or inhibited from programming. By narrowing the threshold voltage distributions, and thus providing more dead space, or margin, between adjacent threshold voltage distributions, accuracy of determining data states of memory cells might be improved and/or memory density (e.g., number of digits of data per memory cell) might be increased.

Although SSPC programming schemes can provide for tighter threshold voltage distributions over more traditional programming schemes, that benefit typically comes with a cost. In particular, memory cells subject to the programming operation must generally be apportioned to different subsets of memory cells for each programming pulse, e.g., one subset of memory cells to be inhibited from programming, one subset of memory cells to be enabled (e.g., fully enabled) for programming, and one subset of memory cells for each level of partial enablement of programming. Each subset of memory cells might correspond to a respective, mutually exclusive, range of threshold voltages. The threshold voltage for each memory cell subject to the programming operation must generally be determined or estimated in order to apportion it to the proper subset of memory cells. This can add time and/or complexity to the verify phase of the programming operation.

U.S. patent application Ser. No. 17/894,248 in the name of Koichi Kawai et al. and filed Aug. 24, 2022 describes a process that seeks to facilitate further narrowing of threshold voltage distributions over typical SSPC programming schemes, while mitigating a need to apportion memory cells for each level of partial enablement of programming. Koichi Kawai et al. describes providing a data line voltage level during a subsequent programming pulse that is inversely related to its corresponding NAND string current level (e.g., $I_{string}$) during a verify phase of the programming operation (e.g., an immediately prior verify phase of the programming operation). Consider the example of eight NAND strings each having a memory cell selected for programming during a programming operation, and exhibiting $I_{string}$ values of $I_0$, $I_1$, $I_2$, $I_3$, $I_4$, $I_5$, $I_6$, and $I_7$ during a verify phase of the programming operation, where $I_0<I_1<I_2<I_3<I_4<I_5<I_6<I_7$. During a subsequent programming pulse, their corresponding data lines might receive voltage levels of $V_0$, $V_1$, $V_2$, $V_3$, $V_4$, $V_5$, $V_6$, and $V_7$, respectively, where $V_0>V_1>V_2>V_3>V_4>V_5>V_6>V_7$.

Koichi Kawai et al. describes the capture of a retained voltage level of a node of a page buffer circuit following or during a verify phase of the programming operation. During the verify phase of the programming operation, the node might be precharged, and then selectively discharged through a data line responsive to a level of activation of a selected memory cell of a programming operation. As such, a memory cell having a higher threshold voltage, e.g., a lower $I_{string}$ in response to a given control gate voltage level, might be expected to result in a higher retained voltage level at the node than a memory cell having a lower threshold voltage, e.g., a higher $I_{string}$ in response to the given control gate voltage level. The remaining voltage level of the node might subsequently be used as a control voltage of a source-follower to generate a data line voltage level for a subsequent programming operation. In this manner, memory cells closer to their target threshold voltage might be expected to receive a higher data line voltage, e.g., lower level of partial enablement, and memory cells farther from their target threshold voltage might be expected to receive a lower data line voltage, e.g., higher level of partial enablement. Such a verify phase might be referred to as an analog verification as the subsequent data line voltage level is not entirely determined in response to whether a sense transistor is activated or not, but is instead open to data line voltage levels that might be proportional (e.g., inversely proportional) to a level of current flow through its corresponding memory cell.

The process of Koichi Kawai et al. facilitates programming a plurality of memory cells to respective ones of N+1 possible data states using N+1 programming pulses. However, the process of Koichi Kawai et al. accepts that some memory cells might not reach their desired threshold voltage in such a manner, with an expectation that error correction schemes might resolve any such errors. Various embodiments described herein seek to mitigate errors caused by memory cells not reaching their intended threshold voltages by further programming such memory cells while facilitating the use of only one additional programming pulse. Various embodiments might utilize an analog verification after one programming pulse and a digital verification after a subsequent programming pulse for each data state other than an initial data state. For example, memory cells having a first intended data state might be the focus of an analog verification following one programming pulse, and might be the focus of a digital verification following a subsequent programming pulse, while memory cells having a second intended data state, which might be a higher (e.g., a next higher) data state, might be the focus of an analog verification following the subsequent programming pulse, and might be the focus of a digital verification following a next subsequent programming pulse. As used herein, a memory cell will be deemed the focus of a verification, e.g., either an analog or digital verification, if the control gate voltage level, e.g., the verify voltage level, used during that verification corresponds to the intended data state for that memory cell.

In contrast to typical analog verification that might allow a memory cell to be inhibited from further programming, partially enabled for further programming, or fully enabled for further programming, data line voltage levels corresponding to memory cells that are the focus of a digital verification in accordance with embodiments might be limited to being either inhibited from further programming or partially enabled for further programming. This efficiency might be possible as the data line voltages and programming pulse following an analog verification for a particular data state might be expected to move each memory cell having the particular data state as its intended data state to a threshold voltage either within or near its desired threshold voltage distribution. As such, a memory cell having the particular data state as its intended data state that has a threshold voltage lower than desired might be placed in its desired threshold voltage distribution without being fully enabled for programming. In addition, fully enabling that memory cell for programming might result in shifting its threshold voltage too far, e.g., to a threshold voltage that could indicate a next higher data state.

FIG. 1 is a simplified block diagram of a first apparatus, in the form of a memory (e.g., memory device) 100, in communication with a second apparatus, in the form of a processor 130, as part of a third apparatus, in the form of an electronic system, according to an embodiment. Some examples of electronic systems include personal computers, personal digital assistants (PDAs), digital cameras, digital media players, digital recorders, games, appliances, vehicles, wireless devices, mobile telephones and the like. The processor 130, e.g., a controller external to the memory device 100, might be a memory controller or other external host device.

Memory device 100 includes an array of memory cells 104 that might be logically arranged in rows and columns. Memory cells of a logical row are typically connected to the same access line (commonly referred to as a word line) while memory cells of a logical column are typically selectively connected to the same data line (commonly referred to as a bit line). A single access line might be associated with more than one logical row of memory cells and a single data line might be associated with more than one logical column. Memory cells (not shown in FIG. 1) of at least a portion of array of memory cells 104 are capable of being programmed to one of at least two target data states.

Row decode circuitry 108 and column decode circuitry 110 are provided to decode address signals. Address signals are received and decoded to access the array of memory cells 104. Memory device 100 also includes input/output (I/O) control circuitry 112 to manage input of commands, addresses and data to the memory device 100 as well as output of data and status information from the memory device 100. An address register 114 is in communication with I/O control circuitry 112, and with row decode circuitry 108 and column decode circuitry 110, to latch the address signals prior to decoding. A command register 124 is in communication with I/O control circuitry 112 and control logic 116 to latch incoming commands.

A controller (e.g., the control logic 116 internal to the memory device 100) controls access to the array of memory cells 104 in response to the commands and might generate status information for the external processor 130, i.e., control logic 116 is configured to perform array operations (e.g., sensing operations [which might include read operations and verify phases of programming operations], programming operations and/or erase operations) on the array of memory cells 104. The control logic 116 is in communication with row decode circuitry 108 and column decode circuitry 110 to control the row decode circuitry 108 and column decode circuitry 110 in response to the addresses. The control logic 116 might include instruction registers 128 which might represent computer-usable memory for storing computer-readable instructions. For some embodiments, the instruction registers 128 might represent firmware. Alternatively, the instruction registers 128 might represent a grouping of memory cells, e.g., reserved block(s) of memory cells, of the array of memory cells 104. The control logic 116 might be configured to cause the memory, e.g., to cause relevant components of the memory, to perform methods according to various embodiments, e.g., through execution of computer-readable instructions stored to the instruction registers 128.

Control logic 116 might also be in communication with a cache register 118. Cache register 118 latches data, either incoming or outgoing, as directed by control logic 116 to temporarily store data while the array of memory cells 104 is busy writing or reading, respectively, other data. During a programming operation (e.g., write operation), data might be passed from the cache register 118 to the data register 120 for transfer to the array of memory cells 104, then new data might be latched in the cache register 118 from the I/O control circuitry 112. During a read operation, data might be passed from the cache register 118 to the I/O control circuitry 112 for output to the external processor 130, then new data might be passed from the data register 120 to the cache register 118. The cache register 118 and/or the data register 120 might form (e.g., might form a portion of) a page buffer of the memory device 100. A data register 120 might further include page buffer circuits (not shown in FIG. 1) to sense a data state of a memory cell of the array of memory cells 104, e.g., by sensing a state of a data line connected to that memory cell. A status register 122 might be in communication with I/O control circuitry 112 and control logic 116 to latch the status information for output to the processor 130.

A trim register 127 might be in communication with the control logic 116. The trim register 127 might represent a volatile memory, latches, or other storage location, e.g., volatile or non-volatile. For some embodiments, the trim register 127 might represent a portion of the array of memory cells 104. Trims might be used by the memory to set values used by an array operation, e.g., voltage levels, timing characteristics, etc., or might be used to selectively activate or deactivate features of the memory.

Memory device 100 receives control signals at control logic 116 from processor 130 over a control link 132. The control signals might include a chip enable CE #, a command latch enable CLE, an address latch enable ALE, a write enable WE #, a read enable RE #, and a write protect WP #. Additional or alternative control signals (not shown) might be further received over control link 132 depending upon the nature of the memory device 100. Memory device 100 receives command signals (which represent commands), address signals (which represent addresses), and data signals (which represent data) from processor 130 over a multiplexed input/output (I/O) bus 134 and outputs data to processor 130 over I/O bus 134.

For example, the commands might be received over input/output (I/O) pins [7:0] of I/O bus 134 at I/O control circuitry 112 and might then be written into command register 124. The addresses might be received over input/output (I/O) pins [7:0] of I/O bus 134 at I/O control circuitry 112 and might then be written into address register 114. The data might be received over input/output (I/O) pins [7:0] for an 8-bit device or input/output (I/O) pins [15:0] for a 16-bit device at I/O control circuitry 112 and then might be written into cache register 118. The data might be subsequently written into data register 120 for programming the array of memory cells 104. Data might also be output over input/output (I/O) pins [7:0] for an 8-bit device or input/output (I/O) pins [15:0] for a 16-bit device. Although reference might be made to I/O pins, they might include any conductive nodes providing for electrical connection to the memory device 100 by an external device (e.g., processor 130), such as conductive pads or conductive bumps as are commonly used.

It will be appreciated by those skilled in the art that additional circuitry and signals can be provided, and that the memory device 100 of FIG. 1 has been simplified. It should be recognized that the functionality of the various block components described with reference to FIG. 1 might not necessarily be segregated to distinct components or component portions of an integrated circuit device. For example, a single component or component portion of an integrated circuit device could be adapted to perform the functionality of more than one block component of FIG. 1. Alternatively, one or more components or component portions of an integrated circuit device could be combined to perform the functionality of a single block component of FIG. 1.

Additionally, while specific I/O pins are described in accordance with popular conventions for receipt and output of the various signals, it is noted that other combinations or numbers of I/O pins (or other I/O node structures) might be used in the various embodiments.

Figure 2:
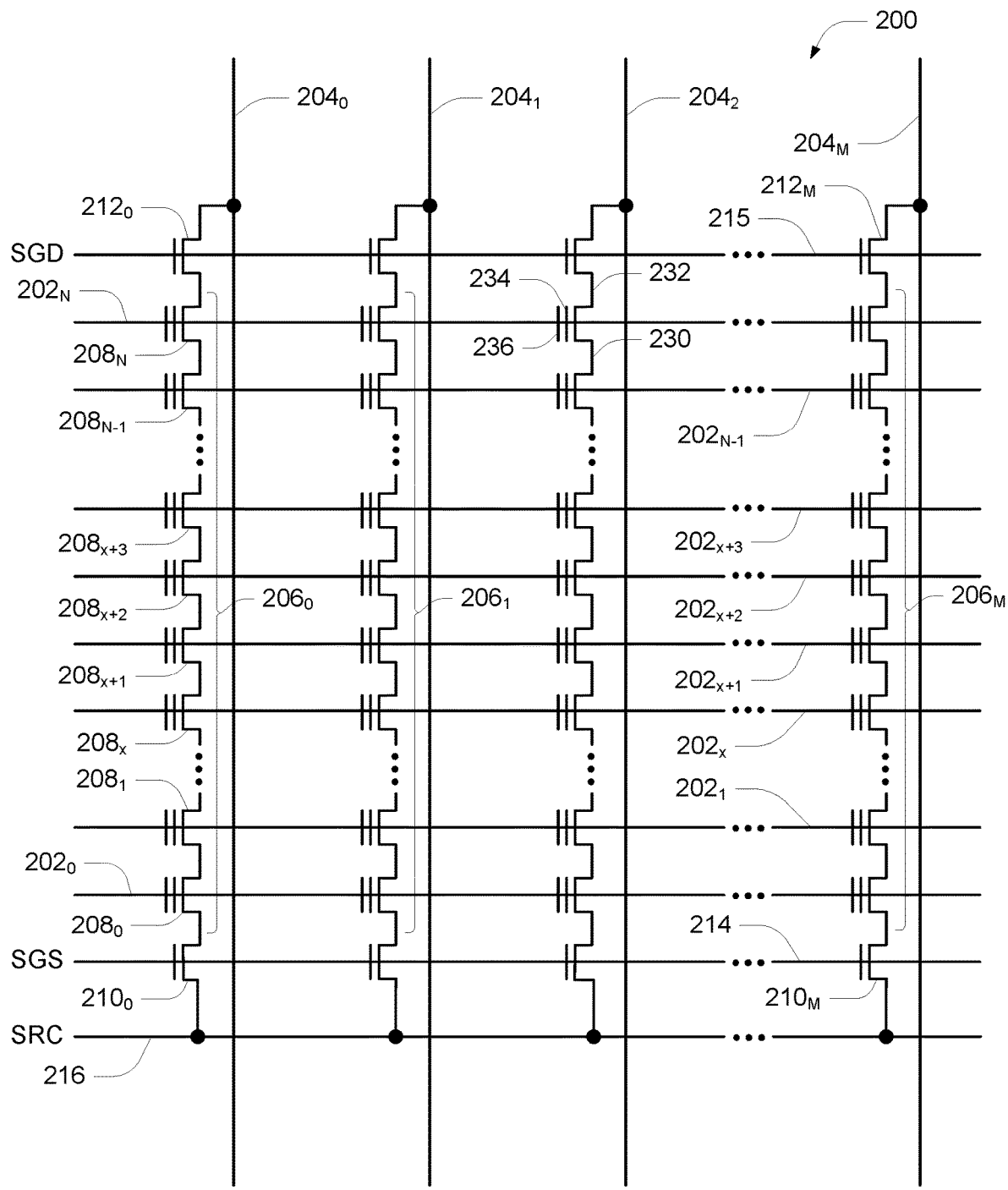
FIG. 2 is a schematic of a portion of an array of memory cells as could be used in a memory of the type described with reference to FIG. 1.

FIG. 2 is a schematic of a portion of an array of memory cells 200, such as a NAND memory array, as could be used in a memory of the type described with reference to FIG. 1, e.g., as a portion of array of memory cells 104. Memory array 200 includes access lines (e.g., word lines) $202_0$ to $202_N$, and data lines (e.g., bit lines) $204_0$ to $204_M$. The access lines 202 might be connected to global access lines (e.g., global word lines), not shown in FIG. 2, in a many-to-one relationship. For some embodiments, memory array 200 might be formed over a semiconductor that, for example, might be conductively doped to have a conductivity type, such as a p-type conductivity, e.g., to form a p-well, or an n-type conductivity, e.g., to form an n-well.

Memory array 200 might be arranged in rows (each corresponding to an access line 202) and columns (each corresponding to a data line 204). Each column might include a string of series-connected memory cells (e.g., non-volatile memory cells), such as one of NAND strings $206_0$ to $206_M$. Each NAND string 206 might be connected (e.g., selectively connected) to a common source (SRC) 216 and might include memory cells $208_0$ to $208_N$. The memory cells 208 might represent non-volatile memory cells for storage of data. The memory cells $208_0$ to $208_N$ might include memory cells intended for storage of data, and might further include other memory cells not intended for storage of data, e.g., dummy memory cells. Dummy memory cells are typically not accessible to a user of the memory, and are instead typically incorporated into the string of series-connected memory cells for operational advantages that are well understood.

The memory cells 208 of each NAND string 206 might be connected in series between a select gate 210 (e.g., a field-effect transistor), such as one of the select gates $210_0$ to $210_M$ (e.g., that might be source select transistors, commonly referred to as select gate source), and a select gate 212 (e.g., a field-effect transistor), such as one of the select gates $212_0$ to $212_M$ (e.g., that might be drain select transistors, commonly referred to as select gate drain). Select gates $210_0$ to $210_M$ might be commonly connected to a select line 214, such as a source select line (SGS), and select gates $212_0$ to $212_M$ might be commonly connected to a select line 215, such as a drain select line (SGD). Although depicted as traditional field-effect transistors, the select gates 210 and 212 might utilize a structure similar to (e.g., the same as) the memory cells 208. The select gates 210 and 212 might represent a plurality of select gates connected in series, with each select gate in series configured to receive a same or independent control signal. In addition, for embodiments utilizing a plurality of select gates connected in series, such select gates might be configured to have the same or different threshold voltages. For example, where gate-induced drain leakage current (GIDL) is desired for programming operations, one or more select gates of the series-connected select gates might have a different (e.g., lower) threshold voltage than one or more other select gates of the series-connected select gates.

A source of each select gate 210 might be connected to common source 216. The drain of each select gate 210 might be connected to a memory cell $208_0$ of the corresponding NAND string 206. For example, the drain of select gate $210_0$ might be connected to memory cell $208_0$ of the corresponding NAND string $206_0$. Therefore, each select gate 210 might be configured to selectively connect a corresponding NAND string 206 to common source 216. A control gate of each select gate 210 might be connected to select line 214.

The drain of each select gate 212 might be connected to the data line 204 for the corresponding NAND string 206. For example, the drain of select gate $212_0$ might be connected to the data line $204_0$ for the corresponding NAND string $206_0$. The source of each select gate 212 might be connected to a memory cell $208_N$ of the corresponding NAND string 206. For example, the source of select gate $212_0$ might be connected to memory cell $208_N$ of the corresponding NAND string $206_0$. Therefore, each select gate 212 might be configured to selectively connect a corresponding NAND string 206 to the corresponding data line 204. A control gate of each select gate 212 might be connected to select line 215.

The memory array in FIG. 2 might be a quasi-two-dimensional memory array and might have a generally planar structure, e.g., where the common source 216, NAND strings 206 and data lines 204 extend in substantially parallel planes. Alternatively, the memory array in FIG. 2 might be a three-dimensional memory array, e.g., where NAND strings 206 might extend substantially perpendicular to a plane containing the common source 216 and to a plane containing the data lines 204 that might be substantially parallel to the plane containing the common source 216.

Typical construction of memory cells 208 includes a data-storage structure 234 (e.g., a floating gate, charge trap, or other structure configured to store charge) that can determine a data state of the memory cell (e.g., through changes in threshold voltage), and a control gate 236, as shown in FIG. 2. The data-storage structure 234 might include both conductive and dielectric structures while the control gate 236 is generally formed of one or more conductive materials. In some cases, memory cells 208 might further have a defined source/drain (e.g., source) 230 and a defined source/drain (e.g., drain) 232. Memory cells 208 have their control gates 236 connected to (and in some cases form) an access line 202.

A column of the memory cells 208 might be a NAND string 206 or a plurality of NAND strings 206 selectively connected to a given data line 204. A row of the memory cells 208 might be memory cells 208 commonly connected to a given access line 202. A row of memory cells 208 can, but need not, include all memory cells 208 commonly connected to a given access line 202. Rows of memory cells 208 might often be divided into one or more groups of physical pages of memory cells 208, and physical pages of memory cells 208 often include every other memory cell 208 commonly connected to a given access line 202. For example, memory cells 208 commonly connected to access line $202_N$ and selectively connected to even data lines 204 (e.g., data lines $204_0$, $204_2$, $204_4$, etc.) might be one physical page of memory cells 208 (e.g., even memory cells) while memory cells 208 commonly connected to access line $202_N$ and selectively connected to odd data lines 204 (e.g., data lines $204_1$, $204_3$, $204_5$, etc.) might be another physical page of memory cells 208 (e.g., odd memory cells). Although data lines $204_3$-$204_5$ are not explicitly depicted in FIG. 2, it is apparent from the figure that the data lines 204 of the array of memory cells 200 might be numbered consecutively from data line $204_0$ to data line $204_M$. Other groupings of memory cells 208 commonly connected to a given access line 202 might also define a physical page of memory cells 208. For certain memory devices, all memory cells commonly connected to a given access line might be deemed a physical page of memory cells. The portion of a physical page of memory cells (which, in some embodiments, could still be the entire row) that is read during a single read operation or programmed during a single programming operation (e.g., an upper or lower page of memory cells) might be deemed a logical page of memory cells. A block of memory cells might include those memory cells that are configured to be erased together, such as all memory cells connected to access lines $202_0$-$202_N$ (e.g., all NAND strings 206 sharing common access lines 202). Unless expressly distinguished, a reference to a page of memory cells herein refers to the memory cells of a logical page of memory cells.

Although the example of FIG. 2 is discussed in conjunction with NAND flash, the embodiments and concepts described herein are not limited to a particular array architecture or structure, and can include other structures (e.g., SONOS or other data storage structure configured to store charge) and other architectures (e.g., AND arrays, NOR arrays, etc.).

A three-dimensional NAND memory array might incorporate vertical structures which might include semiconductor pillars, which might be solid or hollow, where a portion of a pillar might act as a channel region of the memory cells of NAND strings 206, e.g., a region through which current might flow when a memory cell, e.g., a field-effect transistor, is activated. Multiple NAND strings 206 might be selectively connected to the same data line 204. Subsets of NAND strings 206 might be connected to their respective data lines 204 by biasing respective select lines 215 to selectively activate particular select transistors 212 each between a NAND string 206 and a data line 204. The select transistors 210 for each NAND string 206 might be activated by biasing the select line 214. Each access line 202 might be connected to multiple rows of memory cells of a three-dimensional NAND memory array. Rows of memory cells that are commonly connected to each other by a particular access line 202 might collectively be referred to as tiers.

FIG. 3A is a conceptual depiction of threshold voltage distributions of a plurality of memory cells of a first memory density, e.g., three digits of data per memory cell. FIG. 3A illustrates an example of threshold voltage distributions and their threshold voltage ranges for a population of a eight-level memory cells, often referred to as TLC memory cells. For example, such a memory cell might be programmed to a threshold voltage (Vt) that falls within one of eight different threshold voltage distributions $330_0$-$330_7$, each being used to represent a data state corresponding to a bit pattern of three bits. The threshold voltage distribution $330_0$ typically has a greater width than the remaining threshold voltage distributions $330_1$-$330_7$ as memory cells are generally all placed in the data state corresponding to the threshold voltage distribution $330_0$, then subsets of those memory cells are subsequently programmed to have threshold voltages in one of the threshold voltage distributions $330_1$-$330_7$. As programming operations are generally more incrementally controlled than erase operations, these threshold voltage distributions $330_1$-$330_7$ may tend to have tighter distributions.

The threshold voltage distributions $330_0$, $330_1$, $330_2$, $330_3$, $330_4$, $330_5$, $330_6$, and $330_7$ might each represent a respective data state, e.g., L0, L1, L2, L3, L4, L5, L6, and L7, respectively. The eight data states L0-L7 might be thought of as an initial data state L0 and seven remaining data states L1-L7. As an example, if the threshold voltage of a memory cell is within the first of the eight threshold voltage distributions $330_0$, the memory cell in this case may be storing a data state L0 having a data value of logical '111' and is typically referred to as the erased or initial data state of the memory cell. If the threshold voltage is within the second of the eight threshold voltage distributions $330_1$, the memory cell in this case may be storing a data state L1 having a data value of logical '011'. If the threshold voltage is within the third of the eight threshold voltage distributions $330_2$, the memory cell in this case may be storing a data state L2 having a data value of logical '001', and so on. Table 1 provides one possible correspondence between the data states and their corresponding logical data values. Other assignments of data states to logical data values are known. Memory cells remaining in the lowest data state (e.g., the initial data state or L0 data state), as used herein, will be deemed to be programmed to the lowest data state. The information of Table 1 might be contained within the trim register 127, for example.

TABLE 1

| Data State | Logical Data Value |
|---|---|
| L0 | 111 |
| L1 | 011 |
| L2 | 001 |
| L3 | 101 |
| L4 | 100 |
| L5 | 000 |
| L6 | 010 |
| L7 | 110 |

In programming the memory cells represented by the threshold voltage distributions $330_1$-$330_7$, one or more programming pulses might be applied to control gates of the memory cells following by a verification. For example, in programming memory cells of the threshold voltage distribution $330_1$, a verify voltage level $332_1$ might be applied to the control gates of those memory cells. If a memory cell having the data state L1 as its intended data state is deactivated in response to the verify voltage level $332_1$, it might be deemed to have passed verification, such that it might be inhibited from programming for subsequent programming pulses. If that memory cell is activated in response to the verify voltage level $332_1$, it might be deemed to have failed verification, such that it might be enabled, e.g., either partially or fully enabled, for programming for a subsequent programming pulse. Each threshold voltage distribution $330_2$-$330_7$ might have a corresponding verify voltage level $332_2$-$332_7$, respectively, and might follow a similar logic process to determine whether to inhibit or enable their corresponding memory cells for subsequent programming pulses as discussed with reference to the threshold voltage distribution $330_1$.

FIG. 3B is another conceptual depiction of threshold voltage distributions of a plurality of memory cells of a second memory density, e.g., four digits of data per memory cell. FIG. 3B illustrates an example of threshold voltage distributions and their distributions for a population of a sixteen-level memory cells, often referred to as QLC memory cells. For example, such a memory cell might be programmed to a threshold voltage (Vt) that falls within one of sixteen different threshold voltage distributions $330_0$-$330_{15}$, each being used to represent a data state corresponding to a bit pattern of four bits. The threshold voltage distribution $330_0$ typically has a greater width than the remaining threshold voltage distributions $330_1$-$330_{15}$ as memory cells are generally all placed in the data state corresponding to the threshold voltage distribution $330_0$, then subsets of those memory cells are subsequently programmed to have threshold voltages in one of the threshold voltage distributions $330_1$-$330_{15}$. As programming operations are generally more incrementally controlled than erase operations, these threshold voltage distributions $330_1$-$330_{15}$ may tend to have tighter distributions.

The threshold voltage distributions $330_0$, $330_1$, $330_2$, $330_3$, $330_4$, $330_5$, $330_6$, $330_7$, $330_8$, $330_9$, $330_{10}$, $330_{11}$, $330_{12}$, $330_{13}$, $330_{14}$ and $330_{15}$ might each represent a respective data state, e.g., L0, L1, L2, L3, L4, L5, L6, L7, L8, L9, L10, L11, L12, L13, L14 and L15, respectively. The sixteen data states L0-L15 might be thought of as an initial data state L0 and fifteen remaining data states L1-L15. As an example, if the threshold voltage of a memory cell is within the first of the sixteen threshold voltage distributions $330_0$, the memory cell in this case may be storing a data state L0 having a data value of logical '1111' and is typically referred to as the erased or initial data state of the memory cell. If the threshold voltage is within the second of the sixteen threshold voltage distributions $330_1$, the memory cell in this case may be storing a data state L1 having a data value of logical '0111'. If the threshold voltage is within the third of the sixteen threshold voltage distributions $330_2$, the memory cell in this case may be storing a data state L2 having a data value of logical '0011', and so on. Table 2 provides one possible correspondence between the data states and their corresponding logical data values. Other assignments of data states to logical data values are known. Memory cells remaining in the lowest data state (e.g., the initial data state or L0 data state), as used herein, will be deemed to be programmed to the lowest data state. The information of Table 2 might be contained within the trim register 127, for example.

TABLE 2

| Data State | Logical Data Value |
| --- | --- |
| L0 | 1111 |
| L1 | 0111 |
| L2 | 0011 |
| L3 | 1011 |
| L4 | 1001 |
| L5 | 0001 |
| L6 | 0101 |
| L7 | 1101 |
| L8 | 1100 |
| L9 | 0100 |
| L10 | 0000 |
| L11 | 1000 |
| L12 | 1010 |
| L13 | 0010 |
| L14 | 0110 |
| L15 | 1110 |

Although not depicted in FIG. 3B, each threshold voltage distribution $330_1$-$330_{15}$ might have a corresponding verify voltage level $332_1$-$332_{15}$, respectively, and might follow a similar logic process to determine whether to inhibit or enable their corresponding memory cells for subsequent programming pulses as discussed with reference to threshold voltage distribution $330_2$-$330_7$ of FIG. 3A.

Figure 4A:
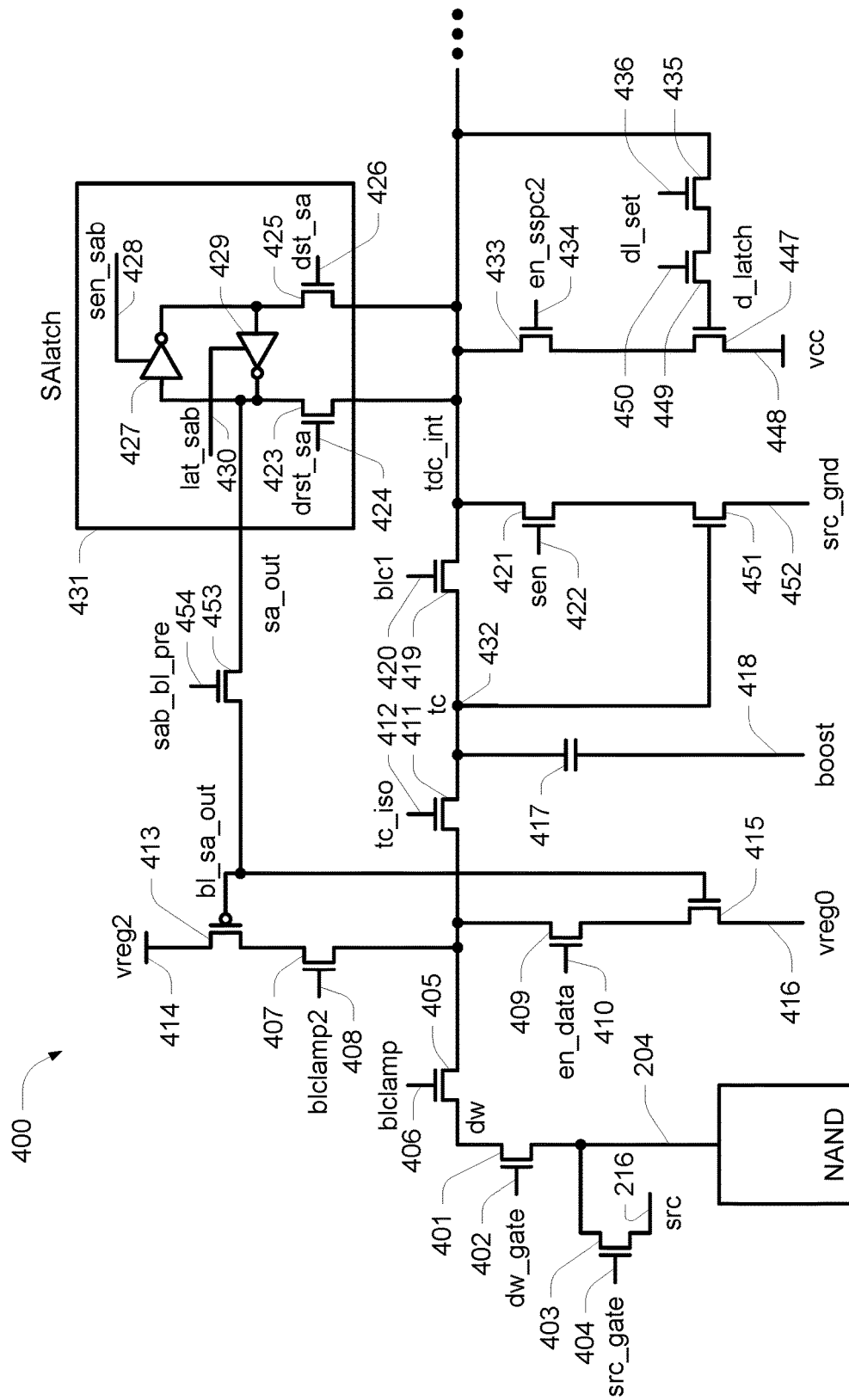
FIGS. 4A-4B are schematics of portions of a page buffer circuit as could be used in a memory of the type described with reference to FIG. 1.
Figure 4B:
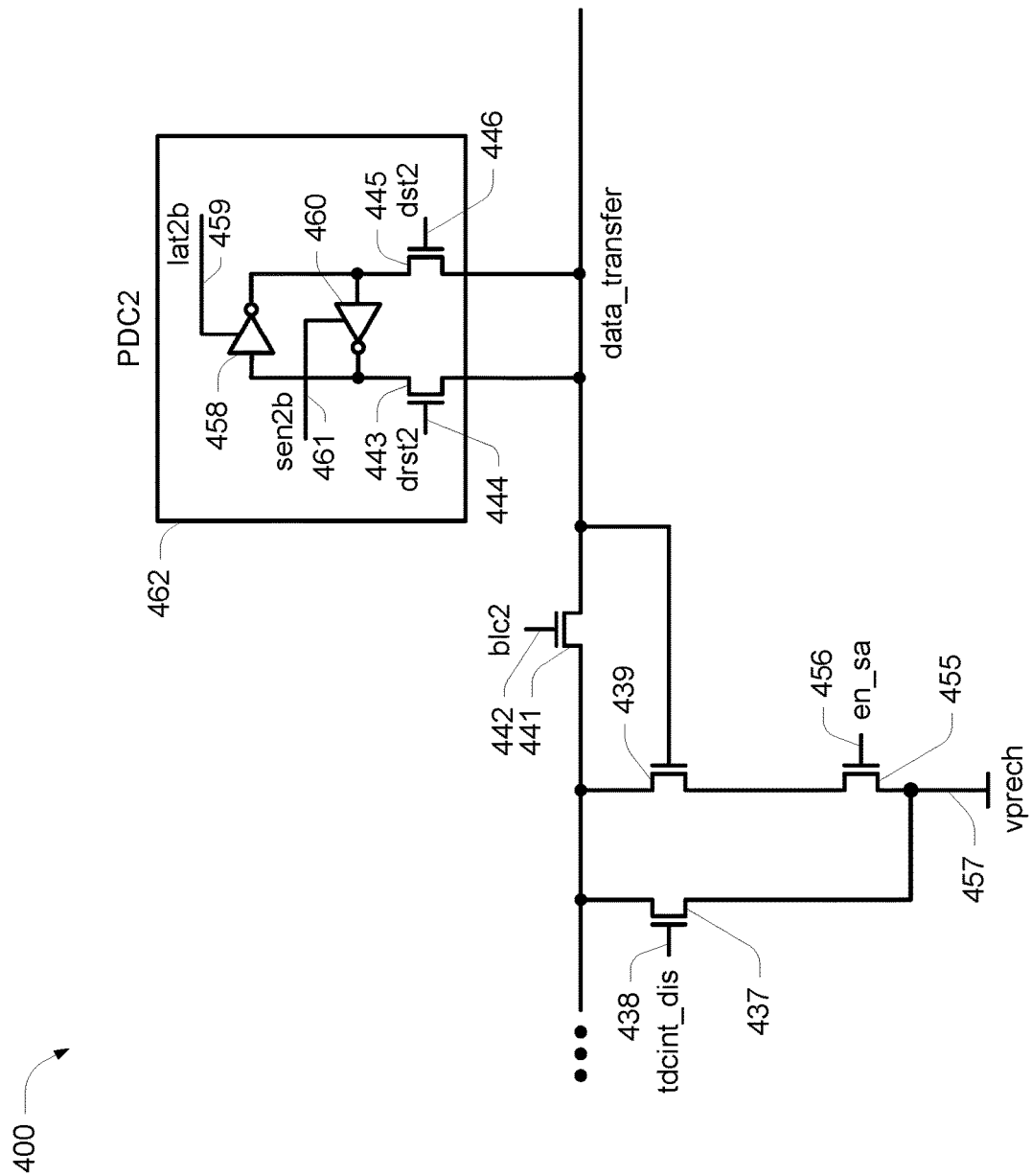

FIGS. 4A-4B are schematics of portions of a page buffer circuit 400 as could be used in a memory of the type described with reference to FIG. 1. Page buffer circuit 400 might be connected (e.g., selectively connected) to a NAND string 206 through a data line 204.

Page buffer circuit 400 might include transistors 401, 403, 405, 407, 409, 411, 413, 415, 419, 421, 433, 435, 438, 439, 441, 447, 449, 451, 453, and 455. The page buffer circuit 400 might further include a sense capacitor 417, a sense amplifier latch 431, and a data latch 462. Transistor 413 might be a p-type field-effect transistor (pFET), while transistors 401, 403, 405, 407, 409, 411, 415, 419, 421, 433, 435, 438, 439, 441, 447, 449, 451, 453, and 455 might be n-type field-effect transistors (nFETs). Sense amplifier latch 431 might include inverters 427 and 429 and transistors 423 and 425 (e.g., nFETs). Data latch (e.g., PDC2) 462 might include inverters 458 and 460 and transistors 443 and 445 (e.g., nFETs).

The data line 204 might be connected to a first source/drain of transistor 401 and a first source/drain of transistor 403. The control gate of transistor 403 might be connected to a src_gate control signal node 404. The second source/drain of transistor 403 might be connected to the common source 216. The control gate of transistor 401 might be connected to a dw_gate control signal node 402. The second source/drain of transistor 401 might be connected to a first source/drain of transistor 405.

The control gate of transistor 405 might be connected to a blclamp control signal node 406. The second source/drain of transistor 405 might be connected to a first source/drain of transistor 407, a first source/drain of transistor 409, and a first source/drain of transistor 411. The control gate of transistor 407 might be connected to a blclamp2 control signal node 408. The second source/drain of transistor 407 might be connected to a first source/drain of transistor 413. The control gate of transistor 413 might be connected to a first source/drain of transistor 453 and the control gate of transistor 415. The control gate of transistor 453 might be connected to a sab_bl_pre control signal node 454. The second source/drain of transistor 453 might be connected to the input of inverter 427, the output of inverter 429, and a first source/drain of transistor 423. The second source/drain of transistor 413 might be connected to a voltage node (e.g., vreg2) 414. The control gate of transistor 409 might be connected to an en_data control signal node 410. The second source/drain of transistor 409 might be connected to a first source/drain of transistor 415. The second source/drain of transistor 415 might be connected to a voltage node (e.g., vreg0) 416.

The control gate of transistor 411 might be connected to a tc_iso control signal node 412. The second source/drain of transistor 411 might be connected to one side (e.g., a first electrode) of sense capacitor 417, a first source/drain of transistor 419, and the control gate of transistor 451 through a tc signal node 432. The other side (e.g., a second electrode) of sense capacitor 417 might be connected to a sense capacitor bias node (e.g., boost node) 418. The control gate of transistor 419 might be connected to a blc1 control signal node 420. The second source/drain of transistor 419 might be connected to a first source/drain of transistor 421, the second source/drain of transistor 423, a first source/drain of transistor 425, a first source/drain of transistor 433, a first source/drain of transistor 435, a first source/drain of transistor 437, a first source/drain of transistor 439, and a first source/drain of transistor 441.

The control gate of transistor 433 might be connected to a en_sspc2 control signal node 434. The second source/drain of transistor 433 might be connected to a first source/drain of transistor 447. The second source/drain of transistor 447 might be connected to a voltage node (e.g., vcc) 448. The control gate of transistor 435 might be connected to a dl_set control signal node 436. The second source/drain of transistor 435 might be connected to a first source/drain of transistor 449. The control gate of transistor 449 might be connected to a d_latch control signal node 450. The second source/drain of transistor 449 might be connected to the control gate of transistor 447.

The control gate of transistor 421 might be connected to a sen control signal node 422. The second source/drain of transistor 421 might be connected to a first source/drain of transistor 451. The second source/drain of transistor 451 might be connected to a source bias node (e.g., src_gnd) 452. The transistor 451 might be referred to as a sense transistor.

The control gate of transistor 423 of sense amplifier latch 431 might be connected to a drst_sa control signal node 424. The control gate of transistor 425 might be connected to a dst_sa control signal node 426. The second source/drain of transistor 425 might be connected to the output of inverter 427 and to the input of inverter 429. A control input of inverter 427 might be connected to a sen_sab control signal node 428. A control input of inverter 429 might be connected to a lat_sab control signal node 430.

The control gate of transistor 437 might be connected to a tccint_dis control signal node 438. The second source/drain of transistor 437 might be connected to a first source/drain of transistor 455 and to a voltage node (e.g., vprech) 457. The control gate of transistor 439 might be connected to the second source/drain of transistor 441, a first source/drain of transistor 443, and a first source/drain of transistor 445. The control gate of transistor 441 might be connected to a blc2 control signal node 442. The control gate of transistor 455 might be connected to a en_sa control signal node 456. The second source/drain of transistor 455 might be connected to the second source/drain of transistor 439.

The control gate of transistor 443 of data latch 462 might be connected to a drst2 control signal node 444. The control gate of transistor 445 might be connected to a dst2 control signal node 446. The second source/drain of transistor 443 might be connected to the output of inverter 460 and to the input of inverter 458. The second source/drain of transistor 445 might be connected to the output of inverter 458 and to the input of inverter 460. A control input of inverter 460 might be connected to a sen2b control signal node 461. A control input of inverter 458 might be connected to a lat2b control signal node 459.

Control logic (e.g., 116 of FIG. 1) might be connected to the src_gate control signal node 404, the dw_gate control signal node 402, the blclamp control signal node 406, the blclamp2 control signal node 408, the en_data control signal node 410, the tc_iso control signal node 412, the BLC1 control signal node 420, the sen control signal node 422, the sab_bl_pre control signal node 454, the en_sspc2 control signal node 434, the dl_set control signal node 436, the d_latch control signal node 450, the tdcint_dis control signal node 438, the en_sa control signal node 456, the lat_sab control signal node 430, the sen_sab control signal node 428, the drst_sa control signal node 424, the dst_sa control signal node 426, the sen2b control signal node 461, the lat2b control signal node 459, the drst2 control signal node 444, and the dst2 control signal node 446 to control the operation of page buffer circuit 400.

Page buffer circuit 400 might be used to sense the data state of the selected memory cell of the NAND string 206 and latch the sensed data state in sense amplifier latch 431 during a read operation or a verify phase of a programming operation. Page buffer circuit 400 might also be used to program a target data state to the selected memory cell based on a state of the sense amplifier latch 431 or a state of one or more data latches. Additional data latches (not shown in FIGS. 4A-4B) might be connected in parallel with, and have a similar (e.g., same) structure as, the data latch 462.

Figure 5:
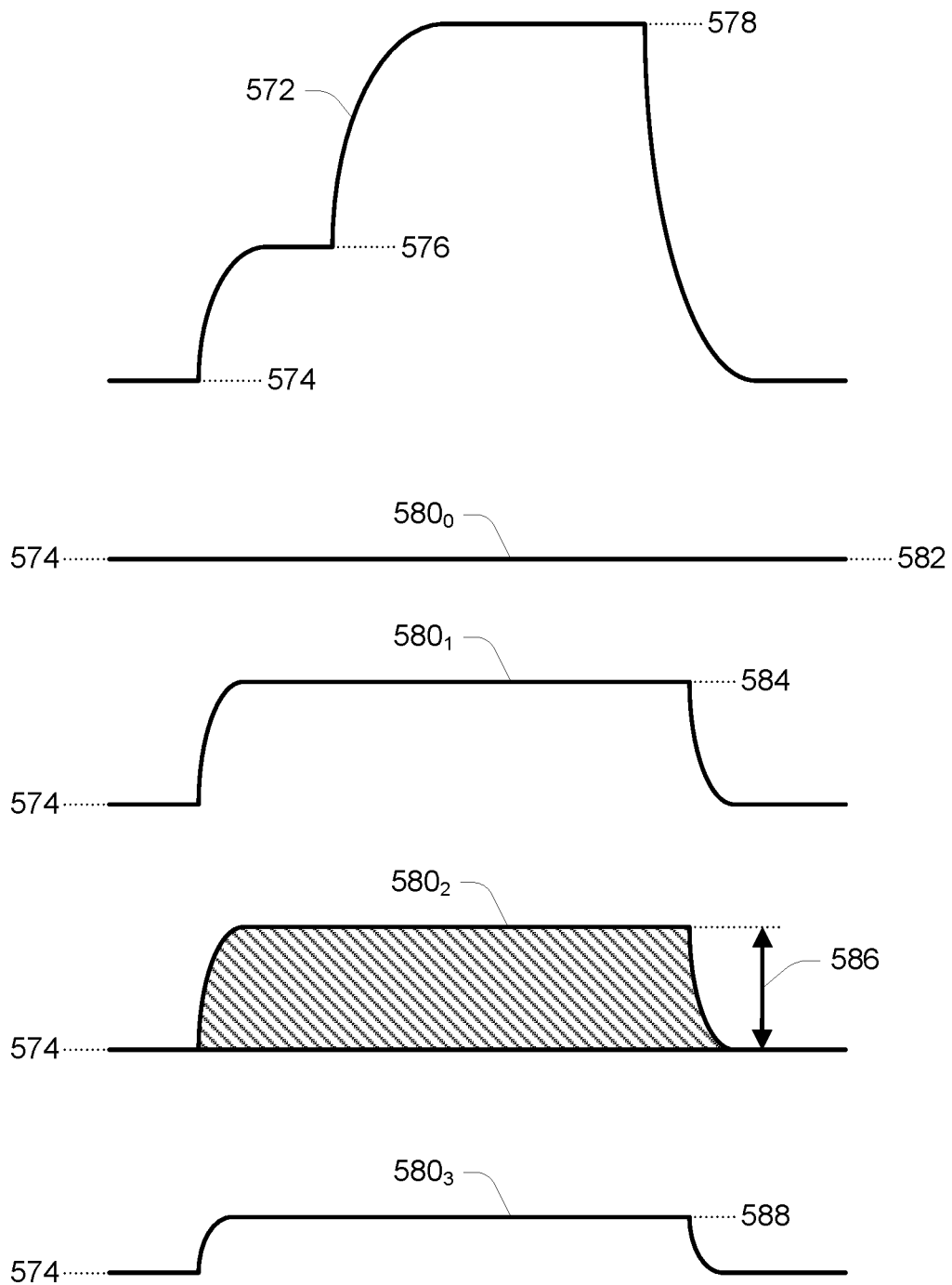
FIG. 5 is a timing diagram depicting voltage levels of data lines and a selected access line for a programming operation in accordance with an embodiment.

FIG. 5 is a timing diagram depicting voltage levels of data lines and a selected access line for a programming operation in accordance with an embodiment. FIG. 5 depicts data line voltage levels that might result from both an analog verification and a digital verification as both might be applicable for a given programming pulse, e.g., the analog verification might be applicable to one data state and the digital verification might be applicable to a lower (e.g., next lower) data state.

Trace 572 might represent the voltage level of a selected access line of the programming operation, e.g., the selected access line might be connected to control gates of a plurality of memory cells selected for programming during the programming operation. Trace $580_0$ might represent the voltage level of a data line that is selectively connected to one of the selected memory cells for which programming is to be fully enabled. Trace $580_0$ might apply to data lines selectively connected to memory cells that are to be fully enabled for programming after an analog verification for their intended data state, as well as data lines selectively connected to memory cells that have higher intended data states for the programming operation.

Trace $580_1$ might represent the voltage level of a data line that is selectively connected to one of the selected memory cells for which programming is to be inhibited after passing verification, e.g., either an analog verification or a digital verification. Trace $580_1$ might apply to data lines selectively connected to memory cells that are to be inhibited from programming after a digital verification for their intended data state, as well as data lines selectively connected to memory cells that have lower intended data states. Trace $580_1$ might further apply to data lines selectively connected to memory cells that are to be inhibited from programming after an analog verification for a next higher intended data state.

The shaded trace $580_2$ might represent the possible voltage levels of a data line that is selectively connected to one of the selected memory cells for which programming is to be partially enabled to one of a plurality of levels following an analog verification. Trace $580_3$ might represent the voltage level of a data line that is selectively connected to one of the selected memory cells for which programming is to be enabled, e.g., partially enabled, following a digital verification.

In FIG. 5, traces 572 and $580_0$-$580_3$ might each have an initial voltage level 574, e.g., a reference potential. The reference potential might be ground, 0V, or the supply voltage Vss, for example. Trace 572 might then be increased to a pass voltage 576. Although not depicted, each unselected access line, e.g., each access line connected to a NAND string other than the selected access line, might also be increased to the pass voltage 576. The pass voltage 576 might be some voltage level configured to activate a memory cell of the NAND string regardless of its data state. Trace 572 might subsequently be increased to a programming voltage level 578. Although not depicted, each unselected access line might remain at the pass voltage 576 while the selected access line is at the programming voltage level 578.

Prior to increasing trace 572 to the programming voltage level 578, trace $580_1$ might be increased to an inhibit voltage level 584, trace $580_2$ might be increased to a voltage level within a range of voltage levels 586, and trace $580_3$ might be increased to a digital enable voltage level 588. The range of voltage levels 586 might include voltage levels that are higher than or equal to a full enable voltage level 582 and lower than the inhibit voltage level 584. The digital enable voltage level 588 might be higher than or equal to the full enable voltage level 582 and lower than the inhibit voltage level 584. Trace $580_0$ might remain at the initial voltage level 574, which might also represent the full enable voltage level 582. For some embodiments, the digital enable voltage level 588 might be set to a voltage level expected to increase the threshold voltage of a digital enabled memory cell by an amount less than a desired state width of its intended data state. For further embodiments, the digital enable voltage level 588 might further be set to a voltage level expected to increase the threshold voltage of a digital enabled memory cell by an amount greater than or equal to 50% of the desired state width of its intended data state.

Memory cells receiving the programming voltage level 578 at their control gates might be expected to have a change (e.g., increase) in threshold voltage dependent upon the level of enablement for programming. For example, a memory cell whose corresponding data line is at the full enable voltage level 582 might be expected to have a first level of change in threshold voltage, and a memory cell whose corresponding data line is at the inhibit voltage level 584 might be expected to have no, or a de minimis, change in threshold voltage. A memory cell whose corresponding data line is at one of the voltage levels within the range of voltage levels 586 might be expected to have one of a number of different levels of change in threshold voltage that are each less than or equal to the first level of change, and greater than no change in threshold voltage. A memory cell whose corresponding data line is at the digital enable voltage level 588 might be expected to have a change in threshold voltage that is less than (e.g., less than or equal to) the first level of change, and greater than no change in threshold voltage.

Figure 6:
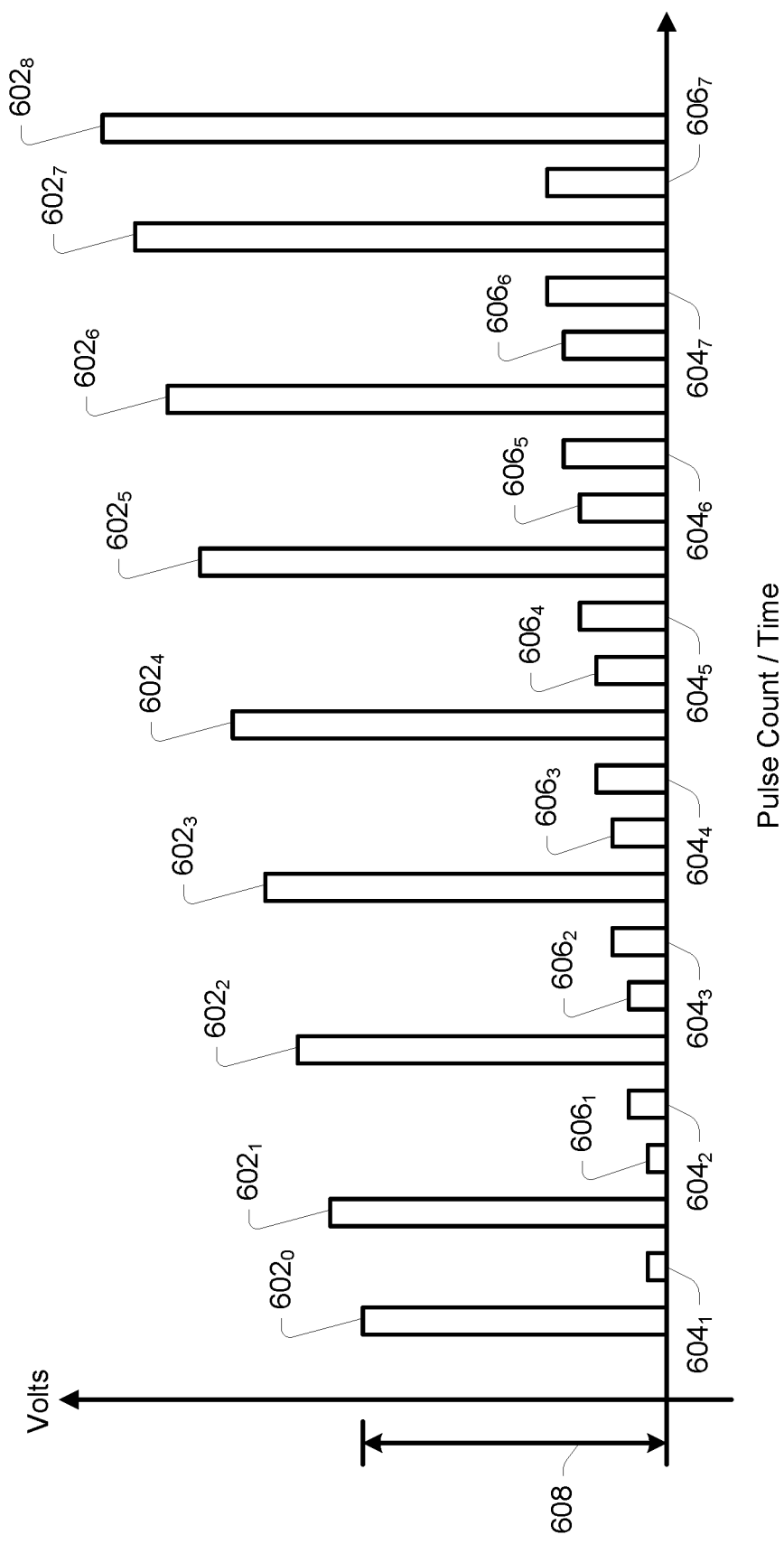
FIG. 6 shows a plot of an access line voltage versus time of a programming operation in accordance with embodiments.

FIG. 6 shows a plot of an access line voltage versus time of a programming operation in accordance with embodiments. Depicted in FIG. 6 is a series of programming pulses 602 (e.g., programming pulses $602_0$-$602_8$). Programming pulses $602_0$-$602_6$ might each be followed by a respective analog verify pulse 604 (e.g., analog verify pulses $604_1$-$604_7$, respectively). Programming pulses $602_1$-$602_7$ might each be followed by a respective digital verify pulse 606 (e.g., digital verify pulses $606_1$-$606_7$, respectively). Although programming pulses 602 followed by both a respective analog verify pulse 604 and a respective digital verify pulse 606 depict the digital verify pulse 606 occurring first, this order is not necessary. FIG. 6 might correspond to a programming operation for a TLC memory, programming memory cells to one of eight different threshold voltage distributions such as depicted in FIG. 3A. Although nine programming pulses 602 are depicted in FIG. 6, programming operations might utilize different numbers (e.g., greater numbers) of programming pulses 602 for different numbers (e.g., greater numbers) of data states.

In FIG. 6, the programming pulses 602 are depicted to have a programming start voltage, e.g., of an initial programming pulse $602_0$, having a voltage level 608. Each subsequent programming pulse might be higher than its immediately prior programming pulse 602. During the programming pulse $602_0$, each memory cell selected for programming to any data state of a plurality of data states for the programming operation other than a lowest (e.g., initial or L0) data state might be enabled, e.g., fully enabled, for programming. That is, their corresponding data lines might be configured to receive an enable voltage level for the programming operation during the programming pulse $602_0$. The L0 memory cells might be inhibited from programming during the programming pulse $602_0$. That is, their corresponding data lines might be configured to receive an inhibit voltage level for the programming operation during the programming pulse $602_0$. The L0 memory cells might further be inhibited from programming for each remaining programming pulse $602_1$-$602_8$.

Following the programming pulse $602_0$ in a programming phase of the programming operation, an analog verify pulse $604_1$ might be applied in an analog verify phase of the programming operation. The analog verify pulse $604_1$ might have a voltage level corresponding to a lower (e.g., lowest) voltage level of the L1 data state, e.g., the verify voltage level $332_1$ corresponding to the threshold voltage distribution $330_1$. During this analog verify phase, a value of VgVt might be determined (e.g., estimated) for memory cells having the L1 data state as their intended data state. The value of VgVt represents a difference between the applied voltage level across a memory cell and its resulting threshold voltage. For example, if a voltage level of 13 volts is applied to a control gate of a memory cell whose body (e.g., channel) is at a ground potential (e.g., 0 volts), and the resulting threshold voltage is −0.5 volt, the VgVt for that memory cell is (13 volts−0 volts)−(−0.5 volts)=13.5 volts. From the value of VgVt for a group of memory cells (e.g., the memory cells selected for programming that have not yet verified), a voltage level of a subsequent programming pulse, e.g., programming pulse $602_1$, might be determined that is deemed sufficient to move a fully enabled L1 memory cell to the desired threshold voltage or above, e.g., higher than or equal to the voltage level of the analog verify pulse $604_1$. For example, a representative threshold voltage for a group of memory cells might be determined. The representative threshold voltage might represent a median of an expected normal distribution of the threshold voltages of the memory cells following the prior programming pulse, which might be determined or estimated in manners well understood in the relevant art. A value of VgVt could be determined from the voltage level of the prior programming pulse and the resulting representative threshold voltage of the group of memory cells, and a voltage level of a subsequent programming pulse could be determined in response to the value of VgVt and the desired threshold voltage (e.g., desired minimum and/or maximum threshold voltage) of the L1 memory cells.

Following the analog verify pulse $604_1$, the programming pulse $602_1$ might be applied in a programming phase of the programming operation. During the programming pulse $602_1$, each memory cell selected for programming to any data state of the plurality of data states for the programming operation higher than the L1 data state might be enabled, e.g., fully enabled, for programming. The L1 memory cells might be inhibited from programming, fully enabled for programming, or partially enabled for programming as determined during the analog verify phase of the programming operation using the analog verify pulse $604_1$.

Following the programming pulse $602_1$, a digital verify pulse $606_1$ might be applied in a digital verify phase of the programming operation. The digital verify pulse $606_1$ might have a voltage level corresponding to the lower (e.g., lowest) voltage level of the L1 data state. During this digital verify phase, the L1 memory cells might be deemed to be either activated (e.g., failed digital verification) or deactivated (e.g., passed digital verification) in response to the digital verify pulse $606_1$. Following, or preceding, the digital verify pulse $606_1$, an analog verify pulse $604_2$ might be applied in an analog verify phase of the programming operation. The analog verify pulse $604_2$ might have a voltage level corresponding to a lower (e.g., lowest) voltage level of the L2 data state, e.g., the verify voltage level $332_2$ corresponding to the threshold voltage distribution $330_2$. During this analog verify phase, a value of VgVt might be determined (e.g., estimated) for memory cells having the L2 data state as their intended data state. From this value of VgVt, a voltage level of a subsequent programming pulse, e.g., programming pulse $602_2$, might be determined that is deemed sufficient to move any fully enabled L2 memory cell to the desired threshold voltage or above, e.g., higher than or equal to the voltage level of the analog verify pulse $604_2$.

Following the analog verify pulse $604_2$ and the digital verify pulse $606_1$, the programming pulse $602_2$ might be applied in a programming phase of the programming operation. During the programming pulse $602_2$, each memory cell selected for programming to any data state of the plurality of data states for the programming operation higher than the L2 data state might be enabled, e.g., fully enabled, for programming. The L1 memory cells might be inhibited from programming or partially enabled for programming as determined during the digital verify phase of the programming operation using the digital verify pulse $606_1$. The L2 memory cells might be inhibited from programming, fully enabled for programming, or partially enabled for programming as determined during the analog verify phase of the programming operation using the analog verify pulse $604_2$. The L1 memory cells might be subsequently inhibited from programming for each remaining programming pulse $602_3$-$602_8$.

Following the programming pulse $602_2$, a digital verify pulse $606_2$ might be applied in a digital verify phase of the programming operation. The digital verify pulse $606_2$ might have a voltage level corresponding to the lower (e.g., lowest) voltage level of the L2 data state. During this digital verify phase, the L2 memory cells might be deemed to be either activated (e.g., failed digital verification) or deactivated (e.g., passed digital verification) in response to the digital verify pulse $606_2$. Following, or preceding, the digital verify pulse $606_2$, an analog verify pulse $604_3$ might be applied in an analog verify phase of the programming operation. The analog verify pulse $604_3$ might have a voltage level corresponding to a lower (e.g., lowest) voltage level of the L3 data state, e.g., the verify voltage level $332_3$ corresponding to the threshold voltage distribution $330_3$. During this analog verify phase, a value of VgVt might be determined (e.g., estimated) for memory cells having the L3 data state as their intended data state. From this value of VgVt, a voltage level of a subsequent programming pulse, e.g., programming pulse $602_3$, might be determined that is deemed sufficient to move any fully enabled L3 memory cell to the desired threshold voltage or above, e.g., higher than or equal to the voltage level of the analog verify pulse $604_3$.

Following the analog verify pulse $604_3$ and the digital verify pulse $606_2$, the programming pulse $602_3$ might be applied in a programming phase of the programming operation. During the programming pulse $602_3$, each memory cell selected for programming to any data state of the plurality of data states for the programming operation higher than the L3 data state might be enabled, e.g., fully enabled, for programming. The L2 memory cells might be inhibited from programming or partially enabled for programming as determined during the digital verify phase of the programming operation using the digital verify pulse $606_2$. The L3 memory cells might be inhibited from programming, fully enabled for programming, or partially enabled for programming as determined during the analog verify phase of the programming operation using the analog verify pulse $604_3$. The L2 memory cells might be subsequently inhibited from programming for each remaining programming pulse $602_4$-$602_8$.

Following the programming pulse $602_3$, a digital verify pulse $606_3$ might be applied in a digital verify phase of the programming operation. The digital verify pulse $606_3$ might have a voltage level corresponding to the lower (e.g., lowest) voltage level of the L3 data state. During this digital verify phase, the L3 memory cells might be deemed to be either activated (e.g., failed digital verification) or deactivated (e.g., passed digital verification) in response to the digital verify pulse $606_3$. Following, or preceding, the digital verify pulse $606_3$, an analog verify pulse $604_4$ might be applied in an analog verify phase of the programming operation. The analog verify pulse $604_4$ might have a voltage level corresponding to a lower (e.g., lowest) voltage level of the L4 data state, e.g., the verify voltage level $332_4$ corresponding to the threshold voltage distribution $330_4$. During this analog verify phase, a value of VgVt might be determined (e.g., estimated) for memory cells having the L4 data state as their intended data state. From this value of VgVt, a voltage level of a subsequent programming pulse, e.g., programming pulse $602_4$, might be determined that is deemed sufficient to move any fully enabled L4 memory cell to the desired threshold voltage or above, e.g., higher than or equal to the voltage level of the analog verify pulse $604_4$.

Following the analog verify pulse $604_4$ and the digital verify pulse $606_3$, the programming pulse $602_4$ might be applied in a programming phase of the programming operation. During the programming pulse $602_4$, each memory cell selected for programming to any data state of the plurality of data states for the programming operation higher than the L4 data state might be enabled, e.g., fully enabled, for programming. The L3 memory cells might be inhibited from programming or partially enabled for programming as determined during the digital verify phase of the programming operation using the digital verify pulse $606_3$. The L4 memory cells might be inhibited from programming, fully enabled for programming, or partially enabled for programming as determined during the analog verify phase of the programming operation using the analog verify pulse $604_4$. The L3 memory cells might be subsequently inhibited from programming for each remaining programming pulse $602_5$-$602_8$.

Following the programming pulse $602_4$, a digital verify pulse $606_4$ might be applied in a digital verify phase of the programming operation. The digital verify pulse $606_4$ might have a voltage level corresponding to the lower (e.g., lowest) voltage level of the L4 data state. During this digital verify phase, the L4 memory cells might be deemed to be either activated (e.g., failed digital verification) or deactivated (e.g., passed digital verification) in response to the digital verify pulse $606_4$. Following, or preceding, the digital verify pulse $606_4$, an analog verify pulse $604_5$ might be applied in an analog verify phase of the programming operation. The analog verify pulse $604_5$ might have a voltage level corresponding to a lower (e.g., lowest) voltage level of the L5 data state, e.g., the verify voltage level $332_5$ corresponding to the threshold voltage distribution $330_5$. During this analog verify phase, a value of VgVt might be determined (e.g., estimated) for memory cells having the L5 data state as their intended data state. From this value of VgVt, a voltage level of a subsequent programming pulse, e.g., programming pulse $602_5$, might be determined that is deemed sufficient to move any fully enabled L5 memory cell to the desired threshold voltage or above, e.g., higher than or equal to the voltage level of the analog verify pulse $604_5$.

Following the analog verify pulse $604_5$ and the digital verify pulse $606_4$, the programming pulse $602_5$ might be applied in a programming phase of the programming operation. During the programming pulse $602_5$, each memory cell selected for programming to any data state of the plurality of data states for the programming operation higher than the L5 data state might be enabled, e.g., fully enabled, for programming. The LA memory cells might be inhibited from programming or partially enabled for programming as determined during the digital verify phase of the programming operation using the digital verify pulse $606_4$. The L5 memory cells might be inhibited from programming, fully enabled for programming, or partially enabled for programming as determined during the analog verify phase of the programming operation using the analog verify pulse $604_5$. The L4 memory cells might be subsequently inhibited from programming for each remaining programming pulse $602_6$-$602_8$.

Following the programming pulse $602_5$, a digital verify pulse $606_5$ might be applied in a digital verify phase of the programming operation. The digital verify pulse $606_5$ might have a voltage level corresponding to the lower (e.g., lowest) voltage level of the L5 data state. During this digital verify phase, the L5 memory cells might be deemed to be either activated (e.g., failed digital verification) or deactivated (e.g., passed digital verification) in response to the digital verify pulse $606_5$. Following, or preceding, the digital verify pulse $606_5$, an analog verify pulse $604_6$ might be applied in an analog verify phase of the programming operation. The analog verify pulse $604_6$ might have a voltage level corresponding to a lower (e.g., lowest) voltage level of the L6 data state, e.g., the verify voltage level $332_6$ corresponding to the threshold voltage distribution $330_6$. During this analog verify phase, a value of VgVt might be determined (e.g., estimated) for memory cells having the L6 data state as their intended data state. From this value of VgVt, a voltage level of a subsequent programming pulse, e.g., programming pulse $602_6$, might be determined that is deemed sufficient to move any fully enabled L6 memory cell to the desired threshold voltage or above, e.g., higher than or equal to the voltage level of the analog verify pulse $604_6$.

Following the analog verify pulse $604_6$ and the digital verify pulse $606_5$, the programming pulse $602_6$ might be applied in a programming phase of the programming operation. During the programming pulse $602_6$, each memory cell selected for programming to any data state of the plurality of data states for the programming operation higher than the L6 data state might be enabled, e.g., fully enabled, for programming. The L5 memory cells might be inhibited from programming or partially enabled for programming as determined during the digital verify phase of the programming operation using the digital verify pulse $606_5$. The L6 memory cells might be inhibited from programming, fully enabled for programming, or partially enabled for programming as determined during the analog verify phase of the programming operation using the analog verify pulse $604_6$. The L5 memory cells might be subsequently inhibited from programming for each remaining programming pulse $602_7$-$602_8$.

Following the programming pulse $602_6$, a digital verify pulse $606_6$ might be applied in a digital verify phase of the programming operation. The digital verify pulse $606_6$ might have a voltage level corresponding to the lower (e.g., lowest) voltage level of the L6 data state. During this digital verify phase, the L6 memory cells might be deemed to be either activated (e.g., failed digital verification) or deactivated (e.g., passed digital verification) in response to the digital verify pulse $606_6$. Following, or preceding, the digital verify pulse $606_6$, an analog verify pulse $604_7$ might be applied in an analog verify phase of the programming operation. The analog verify pulse $604_7$ might have a voltage level corresponding to a lower (e.g., lowest) voltage level of the L7 data state, e.g., the verify voltage level $332_7$ corresponding to the threshold voltage distribution $330_7$. During this analog verify phase, a value of VgVt might be determined (e.g., estimated) for memory cells having the L7 data state as their intended data state. From this value of VgVt, a voltage level of a subsequent programming pulse, e.g., programming pulse $602_7$, might be determined that is deemed sufficient to move any fully enabled L6 memory cell to the desired threshold voltage or above, e.g., higher than or equal to the voltage level of the analog verify pulse $604_7$.

Following the analog verify pulse $604_7$ and the digital verify pulse $606_6$, the programming pulse $602_7$ might be applied in a programming phase of the programming operation. During the programming pulse $602_7$, the L6 memory cells might be inhibited from programming or partially enabled for programming as determined during the digital verify phase of the programming operation using the digital verify pulse $606_6$. The L7 memory cells might be inhibited from programming, fully enabled for programming, or partially enabled for programming as determined during the analog verify phase of the programming operation using the analog verify pulse $604_7$. The L6 memory cells might be subsequently inhibited from programming for the remaining programming pulse $602_8$.

Following the programming pulse $602_7$, a digital verify pulse $606_7$ might be applied in a digital verify phase of the programming operation. The digital verify pulse $606_7$ might have a voltage level corresponding to the lower (e.g., lowest) voltage level of the L7 data state. During this digital verify phase, the L7 memory cells might be deemed to be either activated (e.g., failed digital verification) or deactivated (e.g., passed digital verification) in response to the digital verify pulse $606_7$.

Following the digital verify pulse $606_7$, the programming pulse $602_8$ might be applied in a programming phase of the programming operation. During the programming pulse $602_8$, the L7 memory cells might be inhibited from programming or partially enabled for programming as determined during the digital verify phase of the programming operation using the digital verify pulse $606_7$. A voltage level of the programming pulse $602_8$ might be a predetermined voltage difference higher than the voltage level of the programming pulse $602_7$. For example, the predetermined voltage difference might be a voltage difference less than or equal to a desired width of the threshold voltage distributions $330_1$-$330_7$ in this example. Alternatively, during the digital verify phase using the digital verify pulse $606_7$, a value of VgVt might be determined (e.g., estimated) for memory cells having the L7 data state as their intended data state that failed the digital verification. From this value of VgVt, a voltage level of the programming pulse $602_8$ might be determined that is deemed sufficient to move an enabled L7 memory cell to the desired threshold voltage or above, e.g., higher than or equal to the voltage level of the digital verify pulse $604_8$.

It is recognized that presuming memory cells to have reached their desired threshold voltages without further verification might result in memory cells having threshold voltages below their desired threshold voltages. However, the number of such memory cells might be expected to be small given the inclusion of both an analog verify phase and a digital verify phase for each data state higher than the initial data state, and error correction schemes are generally capable of correcting such erroneous data.

Figure 7:
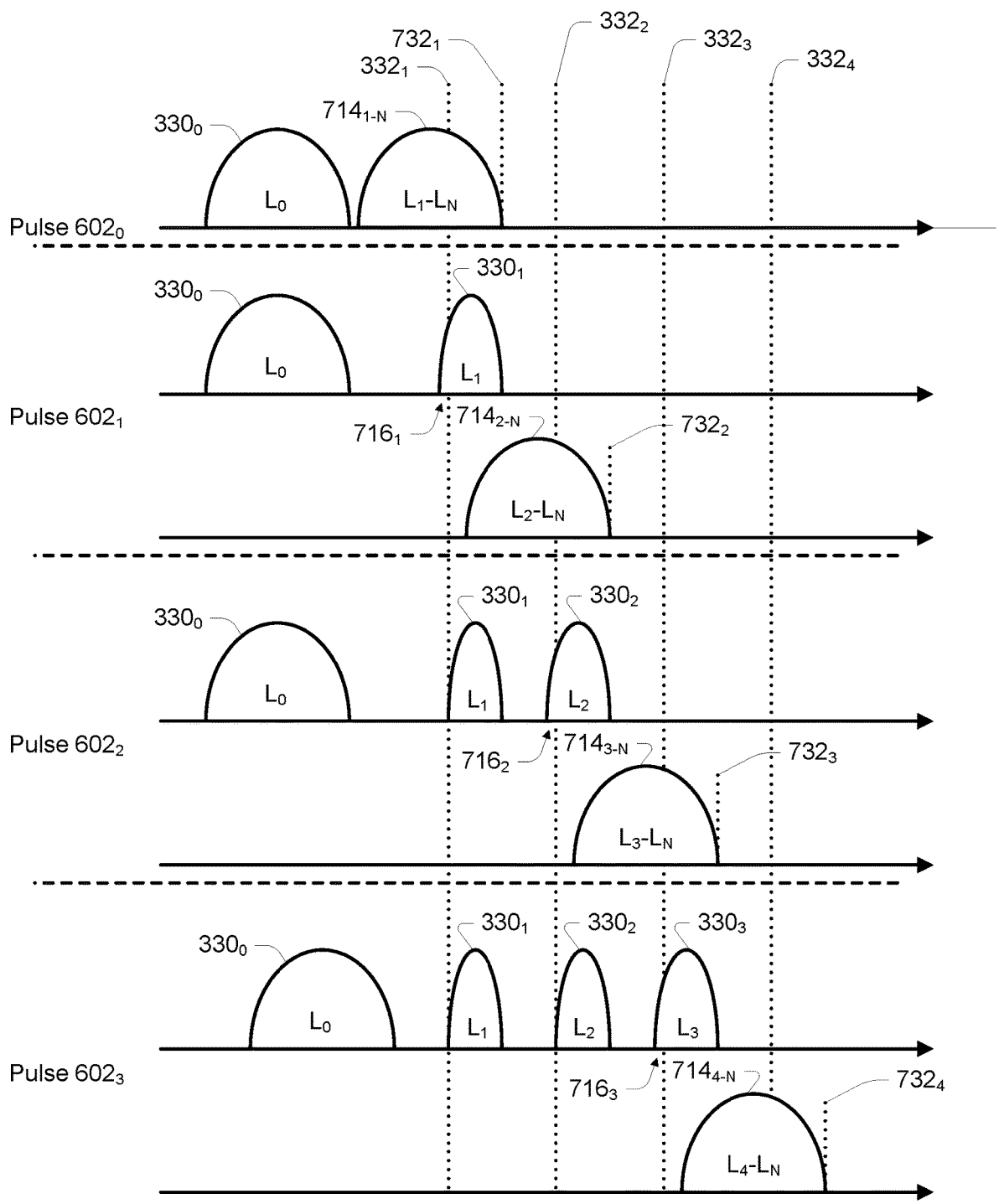
FIG. 7 is a conceptual depiction of a verify phase of the programming operation of FIG. 6.

FIG. 7 is a conceptual depiction of a portion of the programming operation in accordance with an embodiment. For example, FIG. 7 might represent a portion of the programming operation of FIG. 6 for a value of N=7. As such, FIG. 7 will be described with reference to FIG. 6.

Following application of the programming pulse $602_0$, a threshold voltage distribution $714_{1-N}$ might result containing memory cells having the intended data states L1-LN. An upper (e.g., highest) voltage level of the threshold voltage distribution $714_{1-N}$ might be lower than or equal to an upper (e.g., highest) desired voltage level of the L1 data state, e.g., L1_max or voltage level $732_1$. This might be accomplished by selecting a voltage level of the programming pulse $602_0$, Vpgm_init, satisfying the following equation:

$$\text{Vpgm\_init} - VgVt + 3PVS < \text{L1\_max} \qquad \text{Eq. 1}$$

In Equation 1, the value of VgVt might correspond to a representative value of VgVt for the memory cells selected for programming, which might, for example, be predetermined experimentally, empirically or through simulation based on known characteristics (e.g., intrinsic properties) of the memory cells. The value of PVS might correspond to a value (in volt unit per sigma) of one standard deviation (e.g., one sigma of a normal distribution of threshold voltages of the memory cells) responsive to a programming pulse. The value of PVS might, for example, be predetermined experimentally, empirically or through simulation based on known characteristics (e.g., intrinsic properties) of the memory cells. The value of L1_max (e.g., voltage level $732_1$) might be predetermined, and might be equal to a voltage level of the digital verify pulse $606_1$ (e.g., the verify voltage level $332_1$) plus a desired state width for the L1 data state, e.g., the width of the threshold voltage distribution $330_1$ of FIG. 3A. Note that the desired state width for each data state other than L0 might have a same value. Alternatively, desired state widths could be independently defined.

The voltage level of the programming pulse $602_1$ might be determined as a sum of the voltage level of the prior programming pulse, e.g., Vpgm_init, plus a step voltage level, e.g., Vpgm_step, satisfying the following equation:

$$\text{Vpgm\_step} > 7PVS - SW \qquad \text{Eq. 2}$$

In Equation 2, the value of SW might correspond to the desired state width for the L1 data state. Alternatively, the voltage level of the programming pulse $602_1$ might be determined in a similar manner as used for the programming pulse $602_0$, modifying Equation 1 to use a value of VgVt determined in response to applying the analog verify pulse $604_1$, and replacing L1_max with an upper (e.g., highest) desired voltage level of the L2 data state, e.g., L2_max or voltage level $732_2$. The value of L2_max (e.g., voltage level $732_2$) might be predetermined, and might be equal to a voltage level of the digital verify pulse $606_2$ (e.g., the verify voltage level $332_2$) plus a desired state width for the L2 data state, e.g., the width of the threshold voltage distribution $330_2$ of FIG. 3A. Memory cells having a desired data state of L1 might be enabled (e.g., fully enabled or partially enabled) for programming, or inhibited from programming, for the programming pulse $602_1$ depending upon their level of activation in response to applying the analog verify pulse $604_1$. Memory cells having a desired data state of L2 or higher might be enabled (e.g., fully enabled) for programming for the programming pulse $602_1$.

Following application of the programming pulse $602_1$, a threshold voltage distribution $714_{2\text{-}N}$ might result containing memory cells having the intended data states L2-LN, and a threshold voltage distribution $330_1$ might result containing memory cells having the intended data state L1. The programming pulse $602_1$ thus might be considered a fine programming pulse for the L1 memory cells, and a sampling programming pulse for the L2 memory cells. The threshold voltage distribution $330_1$ might have a portion $716_1$ including L1 memory cells having threshold voltage levels lower than their corresponding verify voltage level $332_1$.

The voltage level of the programming pulse $602_2$ might be determined as a sum of the voltage level of the prior programming pulse plus a step voltage level, using the voltage level of the programming pulse $602_1$ as the prior programming pulse, and using the state width of the L3 data state in Equation 2. Alternatively, the voltage level of the programming pulse $602_2$ might be determined in response to a value of VgVt determined in response to applying the analog verify pulse $604_2$, and using an upper (e.g., highest) desired voltage level of the L3 data state as the limit, e.g., L3_max or voltage level 7323. The value of L3_max (e.g., voltage level 7323) might be predetermined, and might be equal to a voltage level of the digital verify pulse $606_3$ (e.g., the verify voltage level $332_3$) plus a desired state width for the L3 data state, e.g., the width of the threshold voltage distribution $330_3$ of FIG. 3A. Memory cells having a desired data state of L1 might be enabled (e.g., partially enabled) for programming, or inhibited from programming, for the programming pulse $602_2$ depending upon their level of activation in response to applying the digital verify pulse $606_1$. Memory cells having a desired data state of L2 might be enabled (e.g., fully enabled or partially enabled) for programming, or inhibited from programming, for the programming pulse $602_2$ depending upon their level of activation in response to applying the analog verify pulse $604_2$. Memory cells having a desired data state of L3 or higher might be enabled (e.g., fully enabled) for programming for the programming pulse $602_2$. Memory cells having a desired data state of L0 might be inhibited from programming for the programming pulse $602_2$.

Following application of the programming pulse $602_2$, a threshold voltage distribution $714_{3\text{-}N}$ might result containing memory cells having the intended data states L3-LN, and a threshold voltage distribution $330_2$ might result containing memory cells having the intended data state L2. In addition, the memory cells of the portion $716_1$ of the threshold voltage distribution $330_1$ might be shifted to have threshold voltage levels higher than or equal to the verify voltage level $332_1$. The programming pulse $602_2$ thus might be considered a compaction programming pulse for the L1 memory cells, a fine programming pulse for the L2 memory cells, and a sampling programming pulse for the L3 memory cells. The threshold voltage distribution $330_2$ might have a portion 7162 including L2 memory cells having threshold voltage levels lower than the verify voltage level $332_2$.

The voltage level of the programming pulse $602_3$ might be determined as a sum of the voltage level of the prior programming pulse plus a step voltage level, using the voltage level of the programming pulse $602_2$ as the prior programming pulse, and using the state width of the L4 data state in Equation 2. Alternatively, the voltage level of the programming pulse $602_3$ might be determined in response to a value of VgVt determined in response to applying the analog verify pulse $604_3$, and using an upper voltage level of the L4 data state as the limit, e.g., L4_max or voltage level $732_4$. The value of L4_max (e.g., voltage level $732_4$) might be predetermined, and might be equal to a voltage level of the digital verify pulse $606_4$ (e.g., the verify voltage level $332_4$) plus a desired state width for the L4 data state, e.g., the width of the threshold voltage distribution $330_4$ of FIG. 3A. Memory cells having a desired data state of L2 might be enabled (e.g., partially enabled) for programming, or inhibited from programming, for the programming pulse $602_3$ depending upon their level of activation in response to applying the digital verify pulse $606_2$. Memory cells having a desired data state of L3 might be enabled (e.g., fully enabled or partially enabled) for programming, or inhibited from programming, for the programming pulse $602_3$ depending upon their level of activation in response to applying the analog verify pulse $604_3$. Memory cells having a desired data state of L4 or higher might be enabled (e.g., fully enabled) for programming for the programming pulse $602_3$. Memory cells having a desired data state of L1 or lower might be inhibited from programming for the programming pulse $602_3$.

Following application of the programming pulse $602_3$, a threshold voltage distribution $714_{4\text{-}N}$ might result containing memory cells having the intended data states L4-LN, and a threshold voltage distribution $330_3$ might result containing memory cells having the intended data state L3. In addition, the memory cells of the portion 7162 of the threshold voltage distribution $330_2$ might be shifted to have threshold voltage levels higher than or equal to the verify voltage level $332_2$. The programming pulse $602_2$ thus might be considered a compaction programming pulse for the L2 memory cells, a fine programming pulse for the L3 memory cells, and a sampling programming pulse for the L4 memory cells. The threshold voltage distribution $330_3$ might have a portion $716_3$ including L3 memory cells having threshold voltage levels lower than the verify voltage level $332_3$. This process can then be repeated for additional programming pulses 602.

Figure 8A:
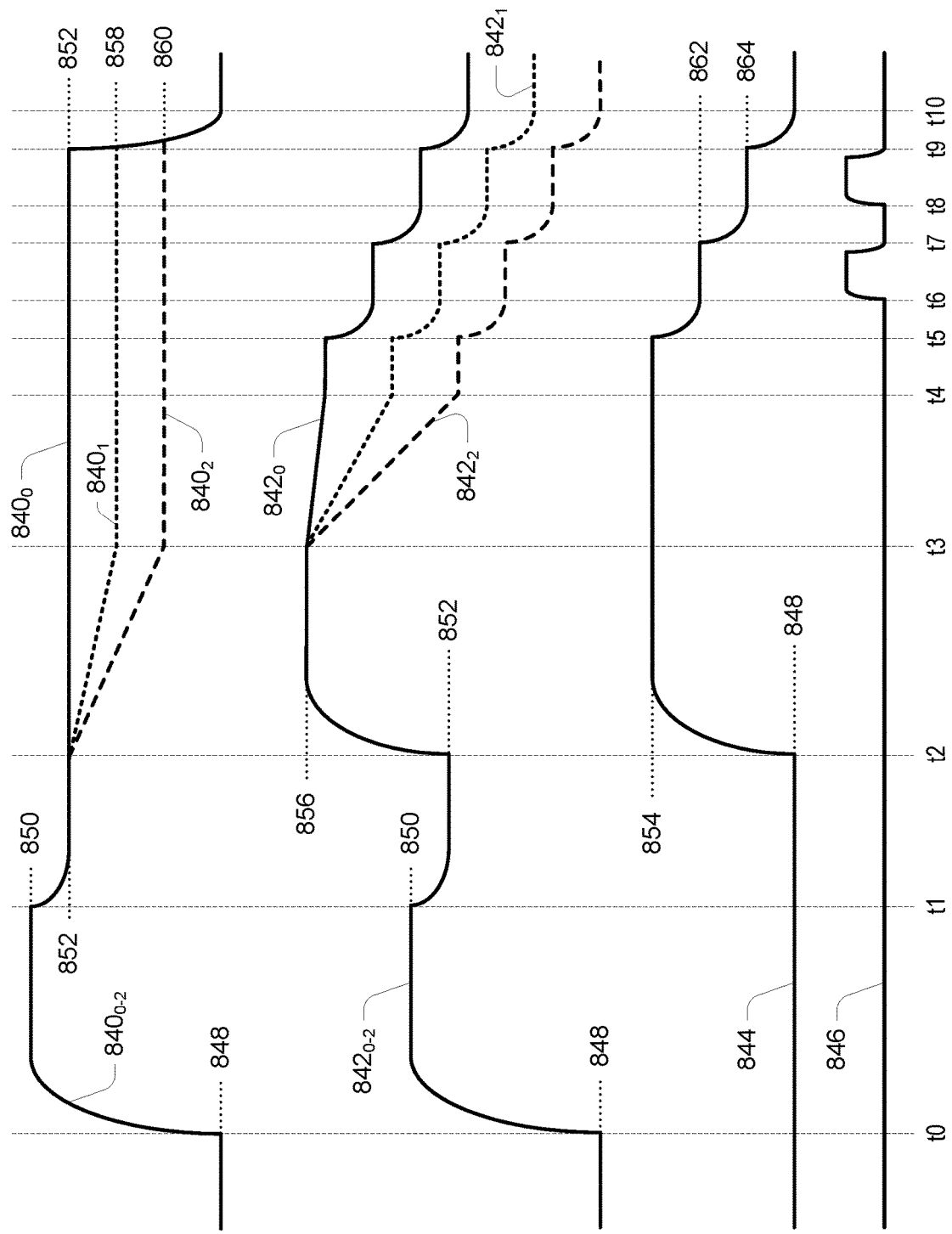
FIG. 8A is a timing diagram generally depicting voltage levels of various nodes of a page buffer circuit at various stages of an analog verify phase of a programming operation in accordance with an embodiment.

FIG. 8A is a timing diagram generally depicting voltage levels of various nodes of a page buffer circuit such as the page buffer circuit 400 depicted in FIGS. 4A-4B at various stages of an analog verify phase of a programming operation in accordance with an embodiment. FIG. 8A provides detail of a portion of an analog verify phase that might be used with embodiments. Traces $840_0$, $840_1$, and $840_2$ might each represent a respective voltage level of a data line 204 corresponding to a memory cell having a first $I_{string}$ value, a second $I_{string}$ value higher than the first $I_{string}$ value, and a third $I_{string}$ value higher than the second $I_{string}$ value, respectively, during the analog verify phase of the programming operation. Traces $842_0$, $842_1$, and $842_2$ might each represent a respective voltage level of a tc signal node 432 corresponding to the data line 204 of traces $840_0$, $840_1$, and $840_2$, respectively. Trace 844 might represent the voltage level of the boost node 418. Trace 846 might represent the voltage level of the sen control signal node 422.

The timing diagram of FIG. 8A generally applies to those memory cells that are the focus of the analog verify phase of the programming operation, e.g., those memory cells having an intended data state corresponding to the voltage level of the analog verify pulse 604 used during the analog verify phase. Memory cells having higher data states might be fully enabled for programming for a subsequent programming pulse regardless of a level of activation in response to the voltage level of the analog verify pulse 604 used during the analog verify phase. Some memory cells having lower data states might be inhibited from or enabled for programming for the subsequent programming pulse regardless of a level of activation in response to the voltage level of the analog verify pulse 604 used during the analog verify phase. For example, programming might be deemed complete for some memory cells having lower data states, e.g., memory cells having been the focus of both an analog verify phase and a digital verify phase along with the application of the corresponding programming pulses, or memory cells might be the focus of a digital verify phase such as described with reference to the timing diagram of FIG. 8B.

With regard to FIG. 8A, a precharge portion of the analog verify phase of the programming operation might begin at time t0 by precharging the tc signal node 432 and the data line 204 from an initial voltage level 848 to a voltage level 850. For example, the tc signal node 432 and data line 204 might be connected to the vreg2 voltage node 414, the sense amplifier latch 431, or the vprech voltage node 457. The voltage level 850 might be higher than the inhibit voltage level Vinh for the programming operation. The voltage level 848 might be a reference potential. At time t1, the tc signal node 432 and the data line 204 might optionally be discharged to a voltage level 852. The voltage level 852 is some voltage level lower than the voltage level 850, and might correspond to the inhibit voltage level Vinh plus a threshold voltage of a transistor to be used as a source-follower for a subsequent programming phase of the programming operation, e.g., the threshold voltage of the transistor 447. For some embodiments, the threshold voltage of the source-follower transistor might be lower than or equal to 0V. To obtain voltage level 852, for example, where the inhibit voltage level Vinh is equal to the supply voltage Vcc, the tc signal node 432 and the data line 204 might be connected to the voltage node 448 through the transistor 447 while the control gate of the transistor 447 is also connected to the tc signal node 432 and data line 204, and the voltage node 448 receives the supply voltage Vcc. Doing this for each memory cell selected for programming that is the focus of the analog verify phase might serve to mitigate any threshold voltage variation among the transistors 447, or other transistors to be used as source-followers, for each page buffer circuit 400 during the subsequent programming phase of the programming operation. The tc signal node 432 might then be isolated from the data line 204.

At time t2, the tc signal node 432 might be boosted by applying a boost voltage level 854 to the boost node 418. While the boost node 418 is depicted to initially be at the same voltage level as the tc signal node 432 at time t2, e.g., voltage level 848, it could start at some other initial voltage level. After isolation of the tc signal node 432 from the data line 204, e.g., between times t1 and time t2, a selected memory cell for the programming operation that is connected to the data line 204 might be selectively activated in response to a voltage level of an analog verify pulse 604 applied to its control gate while each remaining memory cell of its string of series-connected memory cells is activated, e.g., receiving a pass voltage. As a result, the data line 204 might be selectively discharged, e.g., to the common source 216.

For example, if the selected memory cell corresponding to the data line 204 remains deactivated in response to the analog verify pulse 604, the voltage level of the data line 204 might remain unchanged from its precharge voltage level, e.g., as depicted in trace $840_0$. If the selected memory cell corresponding to the data line 204 is partially activated in response to the analog verify pulse 604, the voltage level of the data line 204 might decrease at a first rate, e.g., as depicted in trace $840_1$. And if the selected memory cell corresponding to the data line 204 is fully activated in response to the analog verify pulse 604, the voltage level of the data line 204 might decrease at a second rate greater than the first rate, e.g., as depicted in trace $840_2$. In general, the higher the $I_{string}$ current level for the string of series-connected memory cells containing the selected memory cell during the analog verify phase of the programming operation, the lower the resulting voltage level of its corresponding data line 204. At time t3, the data line 204 might be isolated from the common source 216. Note that the resulting voltage level of the data line 204 at time t3 might depend on the level of activation of its corresponding selected memory cell 208 as well as the length of time that the data line 204 is permitted to selectively discharge to the common source 216.

At time t3, the tc signal node 432 might be connected to its corresponding data line 204. If the corresponding data line 204 is represented by trace $840_0$, the tc signal node 432 might decrease by a first amount, e.g., as depicted in trace $842_0$, as the data line 204 might be at the voltage level 852 that is lower than the boosted voltage level 856 of the tc signal node 432 despite not being discharged. If the selected memory cell corresponding to the data line 204 is partially activated in response to the analog verify pulse 604, the voltage level of the tc signal node 432 might decrease by a second amount greater than the first amount, e.g., as depicted in trace $842_1$. And if the selected memory cell corresponding to the data line 204 is fully activated in response to the analog verify pulse 604, the voltage level of the tc signal node 432 might decrease by a third amount greater than the second amount, e.g., as depicted in trace $842_2$. In general, the higher the $I_{string}$ current level for the string of series-connected memory cells containing the selected memory cell during the analog verify phase of the programming operation, the lower the resulting voltage level of its corresponding tc signal node 432. At time t4, the tc signal node 432 might be isolated from the data line 204. Note that the resulting voltage level of the tc signal node 432 at time t4 might depend on the voltage level of the data line 204 and the length of time, e.g., a develop time, that the tc signal node 432 is connected to the data line 204 for discharge.

At time t5, the voltage level applied to the boost node 418 might be decreased to a first deboost voltage level 862, lower than the boost voltage level 854. As a result, the voltage level of the tc signal node 432 might be correspondingly decreased. At time t6, the page buffer circuit 400 might be strobed by transitioning the sen control signal node 422 to a logic high to activate the transistor 421 to selectively connect the sense amplifier latch 431 to the voltage node 452 through the transistor 451. Memory cells corresponding to tc signal nodes 432 that have a voltage level lower than the threshold voltage of the transistor 451 while the first deboost voltage level 862 is applied to the boost node 418 (e.g., as evidenced by a value latched by the SA latch 431 during the first strobe) might be flagged to receive the enable voltage, e.g., to be fully enabled for programming, during the subsequent programming phase of the programming operation.

The first deboost voltage level 862 might be selected to identify memory cells that are deemed to have a particular threshold voltage level below the target threshold voltage level of their intended data state, e.g., the data state to be verified during the analog verify phase of the programming operation. Lower voltage levels of the first deboost voltage level 862 might be used to shift the range of threshold voltages higher, thus fully enabling greater numbers of memory cells. Higher voltage levels of the first deboost voltage level 862 might be used to shift the range of threshold voltages lower, thus fully enabling lesser numbers of memory cells.

At time t7, the voltage level applied to the boost node 418 might be decreased to a second deboost voltage level 864, lower than the first deboost voltage level 862. As a result, the voltage level of the tc signal node 432 might be correspondingly decreased. At time t8, the page buffer circuit 400 might be strobed by transitioning the sen control signal node 422 to a logic high to activate the transistor 421 to selectively connect the sense amplifier latch 431 to the voltage node 452 through the transistor 451. Memory cells corresponding to tc signal nodes 432 that have voltage levels higher than (e.g., higher than or equal to) the threshold voltage of the transistor 451 while the second deboost voltage level 864 is applied to the boost node 418 (e.g., as evidenced by a value latched by the SA latch 431 during the second strobe) might be flagged to receive the inhibit voltage level, e.g., to be inhibited from programming, during the subsequent programming phase of the programming operation.

The second deboost voltage level 864 might be selected to identify memory cells that are deemed to have a threshold voltage level higher than (e.g., higher than or equal to) the target threshold voltage level of their intended data state, e.g., the data state to be verified during the analog verify phase of the programming operation. Higher voltage levels of the second deboost voltage level 864 might be used to shift the range of threshold voltages higher, thus inhibiting greater numbers of memory cells. Lower voltage levels of the second deboost voltage level 864 might be used to shift the range of threshold voltages lower, thus inhibiting lesser numbers of memory cells.

It is noted that the number of memory cells selected for programming that indicate deactivation of the transistor 451 for each deboost voltage level might provide information for determining a VgVt value for the memory cells selected for programming. In particular, the number of memory cells that indicate deactivation at the first deboost voltage level 862 would indicate a number of memory cells having a threshold voltage level lower than or equal to a first threshold voltage level, and the number of memory cells that indicate deactivation at the second deboost voltage level 864 would indicate a number of memory cells having a threshold voltage level lower than or equal to a second threshold voltage level that is higher than the first threshold voltage level. Where a normal distribution of threshold voltages is presumed, these two data points could define characteristics of the normal distribution, e.g., the median of the normal distribution.

Identifying memory cells to be fully enabled for programming, or to be inhibited from programming, during a subsequent programming phase might further identify memory cells to be partially enabled for programming for the subsequent programming phase. For example, memory cells selected for programming to the data state to be verified by the analog verify phase of the programming operation that are not identified to be fully enabled for programming for the subsequent programming phase, and are not identified to be inhibited from programming for the subsequent programming phase, might represent those memory cells to be partially enabled for programming for the subsequent programming phase. The data lines corresponding to these memory cells might then be configured to receive a voltage level for the subsequent programming phase from a source-follower transistor in accordance with embodiments.

At time t9, the voltage level applied to the boost node 418 might be returned to its initial voltage level, e.g., the voltage level 848. As a result, the voltage level of the tc signal node 432 might be correspondingly decreased. At time t10, the remaining voltage level of the tc signal node 432 might be indicative of the threshold voltage of its corresponding memory cell. For example, tc signal nodes 432 having voltage levels closer to the precharge voltage level, e.g., the voltage level 852 (or 850), might be expected to have threshold voltage levels closer to their respective target data states, while tc signal nodes 432 having voltage levels closer to the initial voltage level, e.g., the voltage level 848, might be expected to have threshold voltage levels farther from their respective target data states. For those tc signal nodes 432 whose corresponding memory cells were not flagged to either receive the enable voltage or the inhibit voltage level for a subsequent programming pulse might be flagged to receive a data line voltage level representative of, which might include equal to, the remaining voltage level of that tc signal node 432.

At time t10, the control gate of the transistor to be used as a source-follower might be connected to the tc signal node 432, thus applying a voltage level at the control gate representative of the remaining voltage level of the tc signal node 432. Using the transistor 447 as an example, the transistors 449, 435, and 419 might be activated. While transistors 449, 435, and 419 are activated, the transistor 433 might be deactivated in response to the en_sspc2 control signal node 434. In this manner, the tc signal node 432 might be isolated from the voltage node 448. This might connect the voltage level of the tc signal node 432, or a voltage level representative of the voltage level of the tc signal node 432, to the control gate of the transistor 447. The transistor 449 and/or the transistor 435 might subsequently be deactivated, leaving the control gate of the transistor 447 electrically floating with a voltage level representative to the voltage level of the tc signal node 432.

For a subsequent programming pulse, a voltage level higher than the enable voltage level might be applied to the voltage node 448 while the transistor 447 is connected to the data line 204 and its control gate remains electrically floating at a voltage level representative of the remaining voltage level of the tc signal node 432 following the analog verify phase of the programming operation. For example, the transistor 449 and/or the transistor 435 might remain deactivated, and the transistors 433, 419, 411, 405, and 401 might be activated to connect the transistor 447 to the data line 204. In this manner, the data line 204 might receive a voltage level that is lower than or equal to the voltage level applied to the voltage node 448, which might further be higher than (e.g., higher than or equal to) the enable voltage. For some embodiments, the voltage level applied to the voltage node 448 might be equal to the inhibit voltage level Vinh. For further embodiments, the voltage level applied to the voltage node 448 might be higher than the inhibit voltage level Vinh.

It is recognized that the length of time the data line 204 is permitted to selectively discharge through the memory cell from time t2-t3 of FIG. 8A, and the length of time the tc signal node 432 is permitted to discharge to the data line 204 from time t3-t4 of FIG. 8A, will each affect the extent of discharge of the tc signal node 432 at time t4 of FIG. 8A. Determining suitable lengths of time, as well as suitable boost and deboost voltage levels, to identify groups of memory cells that should be fully enabled for programming and groups of memory cells that should be inhibited from programming, might, for example, be determined experimentally, empirically or through simulation based on known characteristics (e.g., intrinsic properties) of the participating circuit elements.

Although the transistor 447 of the page buffer circuit 400 was utilized as the source-follower transistor in the foregoing example, a source-follower transistor to be used for various embodiments could be another transistor that has a control gate connected or selectively connected to a node of a page buffer circuit whose voltage level is indicative of a data state of a memory cell following an analog verify phase of a programming operation, a source/drain selectively connected to a corresponding data line of the memory cell, and another source/drain configured to receive a voltage level for driving the corresponding data line during a subsequent programming phase of the programming operation. Note that such guidance can be applied to page buffer circuits of designs other than that depicted in FIGS. 4A-4B.

Figure 8B:
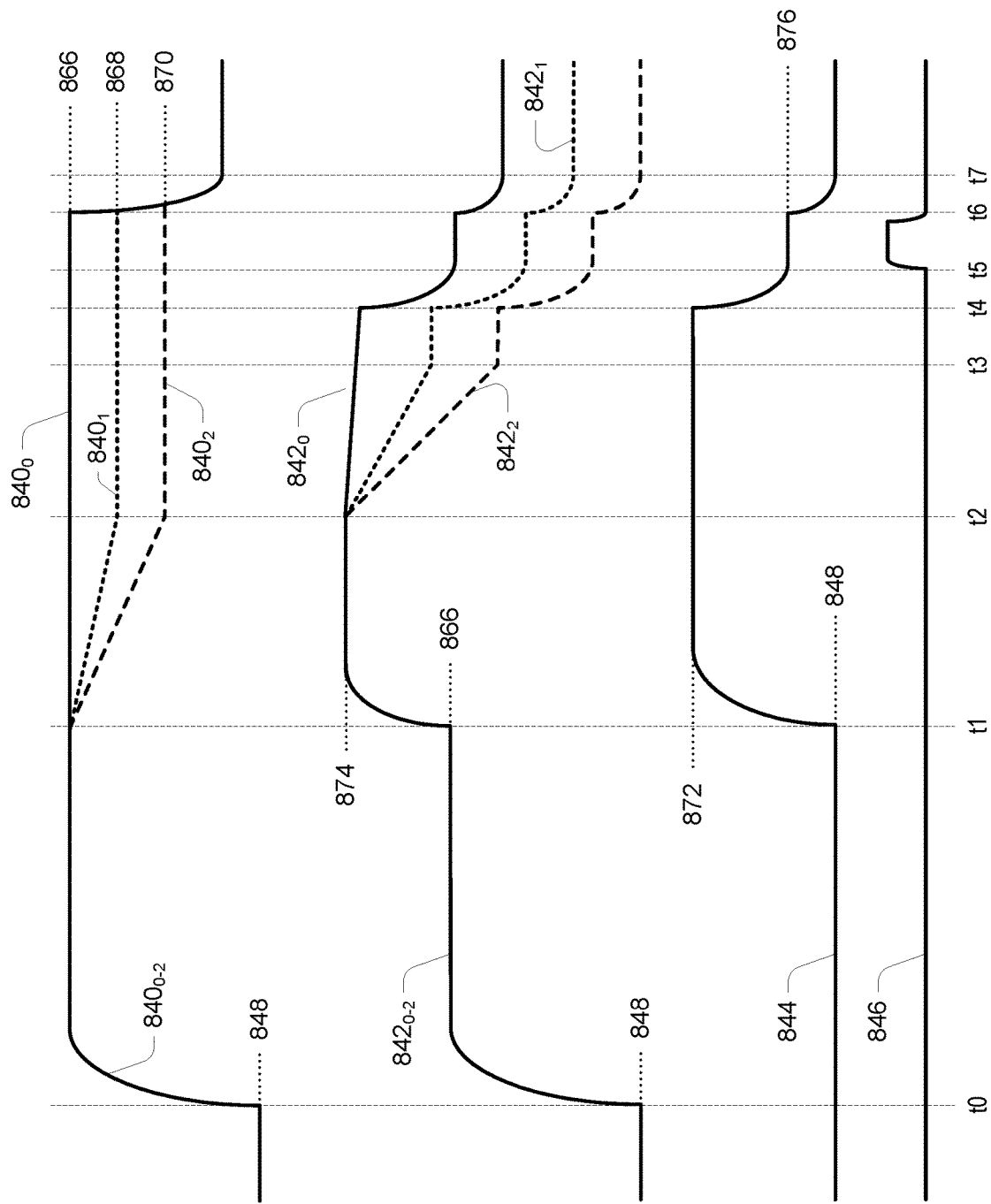
FIG. 8B is a timing diagram generally depicting voltage levels of various nodes of a page buffer circuit at various stages of a digital verify phase of a programming operation in accordance with an embodiment.

FIG. 8B is a timing diagram generally depicting voltage levels of various nodes of a page buffer circuit such as the page buffer circuit 400 depicted in FIGS. 4A-4B at various stages of a digital verify phase of a programming operation in accordance with an embodiment. FIG. 8B provides detail of a portion of a digital verify phase that might be used with embodiments. Traces $840_0$, $840_1$, and $840_2$ might each represent a respective voltage level of a data line 204 corresponding to a memory cell having a first $I_{string}$ value, a second $I_{string}$ value higher than the first $I_{string}$ value, and a third $I_{string}$ value higher than the second $I_{string}$ value, respectively, during the digital verify phase of the programming operation. Traces $842_0$, $842_1$, and $842_2$ might each represent a respective voltage level of a tc signal node 432 corresponding to the data line 204 of traces $840_0$, $840_1$, and $840_2$, respectively. Trace 844 might represent the voltage level of the boost node 418. Trace 846 might represent the voltage level of the sen control signal node 422.

The timing diagram of FIG. 8B generally applies to those memory cells that are the focus of the digital verify phase of the programming operation, e.g., those memory cells having an intended data state corresponding to the voltage level of the digital verify pulse 606 used during the digital verify phase. Some memory cells having higher data states might be enabled for programming (e.g., partially enabled or fully enabled) for a subsequent programming pulse regardless of a level of activation in response to the voltage level of the digital verify pulse 606 used during the digital verify phase. For example, some memory cells might be the focus of a corresponding analog verify phase such as described with reference to the timing diagram of FIG. 8A, while other memory cells might have data states higher than the memory cells that are the focus of the corresponding analog verify phase. A digital verify phase corresponds to an analog verify phase in situations where those verify phases are performed between a same set of programming pulses. Some memory cells having lower data states might be inhibited from programming for the subsequent programming pulse regardless of a level of activation in response to the voltage level of the digital verify pulse 606 used during the digital verify phase. For example, programming might be deemed complete for some memory cells having lower data states, e.g., memory cells having been the focus of both an analog verify phase and a digital verify phase along with the application of the corresponding programming pulses.

With regard to FIG. 8B, a precharge portion of the digital verify phase of the programming operation might begin at time t0 by precharging the tc signal node 432 and the data line 204 from an initial voltage level 848 to a voltage level 866. The voltage level 866 might be equal to or different than the voltage level 850 of FIG. 8A. For example, the tc signal node 432 and data line 204 might be connected to the vreg2 voltage node 414, the sense amplifier latch 431, or the vprech voltage node 457. The voltage level 848 might be a reference potential. The tc signal node 432 might then be isolated from the data line 204.

At time t1, the tc signal node 432 might be boosted by applying a boost voltage level 872 to the boost node 418. While the boost node 418 is depicted to initially be at the same voltage level as the tc signal node 432 at time t1, e.g., voltage level 848, it could start at some other initial voltage level. After isolation of the tc signal node 432 from the data line 204, e.g., between times t0 and t1, a selected memory cell for the programming operation that is connected to the data line 204 might be selectively activated in response to a voltage level of a digital verify pulse 606 applied to its control gate while each remaining memory cell of its string of series-connected memory cells is activated, e.g., receiving a pass voltage. As a result, the data line 204 might be selectively discharged, e.g., to the common source 216.

For example, if the selected memory cell corresponding to the data line 204 remains deactivated in response to the digital verify pulse 606, the voltage level of the data line 204 might remain unchanged from its precharge voltage level, e.g., as depicted in trace $840_0$. If the selected memory cell corresponding to the data line 204 is partially activated in response to the digital verify pulse 606, the voltage level of the data line 204 might decrease at a first rate, e.g., as depicted in trace $840_1$. And if the selected memory cell corresponding to the data line 204 is fully activated in response to the digital verify pulse 606, the voltage level of the data line 204 might decrease at a second rate greater than the first rate, e.g., as depicted in trace $840_2$. In general, the higher the $I_{string}$ current level for the string of series-connected memory cells containing the selected memory cell during the digital verify phase of the programming operation, the lower the resulting voltage level of its corresponding data line 204. At time t2, the data line 204 might be isolated from the common source 216. Note that the resulting voltage level of the data line 204 at time t2 might depend on the level of activation of its corresponding selected memory cell 208 as well as the length of time that the data line 204 is permitted to selectively discharge to the common source 216.

At time t2, the tc signal node 432 might be connected to its corresponding data line 204. If the corresponding data line 204 is represented by trace $840_0$, the tc signal node 432 might decrease by a first amount, e.g., as depicted in trace $842_0$, as the data line 204 might be at the voltage level 866 that is lower than the boosted voltage level 874 of the tc signal node 432 despite not being discharged. If the selected memory cell corresponding to the data line 204 is partially activated in response to the analog verify pulse 604, the voltage level of the tc signal node 432 might decrease by a second amount greater than the first amount, e.g., as depicted in trace $842_1$. And if the selected memory cell corresponding to the data line 204 is fully activated in response to the analog verify pulse 604, the voltage level of the tc signal node 432 might decrease by a third amount greater than the second amount, e.g., as depicted in trace $842_2$. In general, the higher the $I_{string}$ current level for the string of series-connected memory cells containing the selected memory cell during the digital verify phase of the programming operation, the lower the resulting voltage level of its corresponding tc signal node 432. At time t3, the tc signal node 432 might be isolated from the data line 204. Note that the resulting voltage level of the tc signal node 432 at time t3 might depend on the voltage level of the data line 204 and the length of time, e.g., a develop time, that the tc signal node 432 is connected to the data line 204 for discharge.

At time t4, the voltage level applied to the boost node 418 might be decreased to a deboost voltage level 876, lower than the boost voltage level 872. As a result, the voltage level of the tc signal node 432 might be correspondingly decreased. At time t5, the page buffer circuit 400 might be strobed by transitioning the sen control signal node 422 to a logic high to activate the transistor 421 to selectively connect the sense amplifier latch 431 to the voltage node 452 through the transistor 451. Memory cells corresponding to tc signal nodes 432 that have a voltage level lower than the threshold voltage of the transistor 451 while the first deboost voltage level 862 is applied to the boost node 418 (e.g., as evidenced by a value latched by the SA latch 431 during the first strobe) might be flagged to receive the digital enable voltage level, e.g., to be partially enabled for programming, during the subsequent programming phase of the programming operation.

The deboost voltage level 876 might be selected to identify memory cells that are deemed to have a threshold voltage level below the target threshold voltage level of their intended data state, e.g., the data state to be verified during the digital verify phase of the programming operation. Lower voltage levels of the deboost voltage level 876 might be used to shift the range of threshold voltages higher, thus enabling greater numbers of memory cells. Higher voltage levels of the deboost voltage level 876 might be used to shift the range of threshold voltages lower, thus enabling lesser numbers of memory cells.

At time t6, the voltage level applied to the boost node 418 might be returned to its initial voltage level, e.g., the voltage level 848. As a result, the voltage level of the tc signal node 432 might be correspondingly decreased.

It is recognized that the length of time the data line 204 is permitted to selectively discharge through the memory cell from time t1-t2 of FIG. 8B, and the length of time the tc signal node 432 is permitted to discharge to the data line 204 from time t2-t3 of FIG. 8B, will each affect the extent of discharge of the tc signal node 432 at time t3 of FIG. 8B. Determining suitable lengths of time, as well as suitable boost and deboost voltage levels, to identify groups of memory cells that should be enabled for programming and groups of memory cells that should be inhibited from programming, might, for example, be determined experimentally, empirically or through simulation based on known characteristics (e.g., intrinsic properties) of the participating circuit elements.

Figure 9:
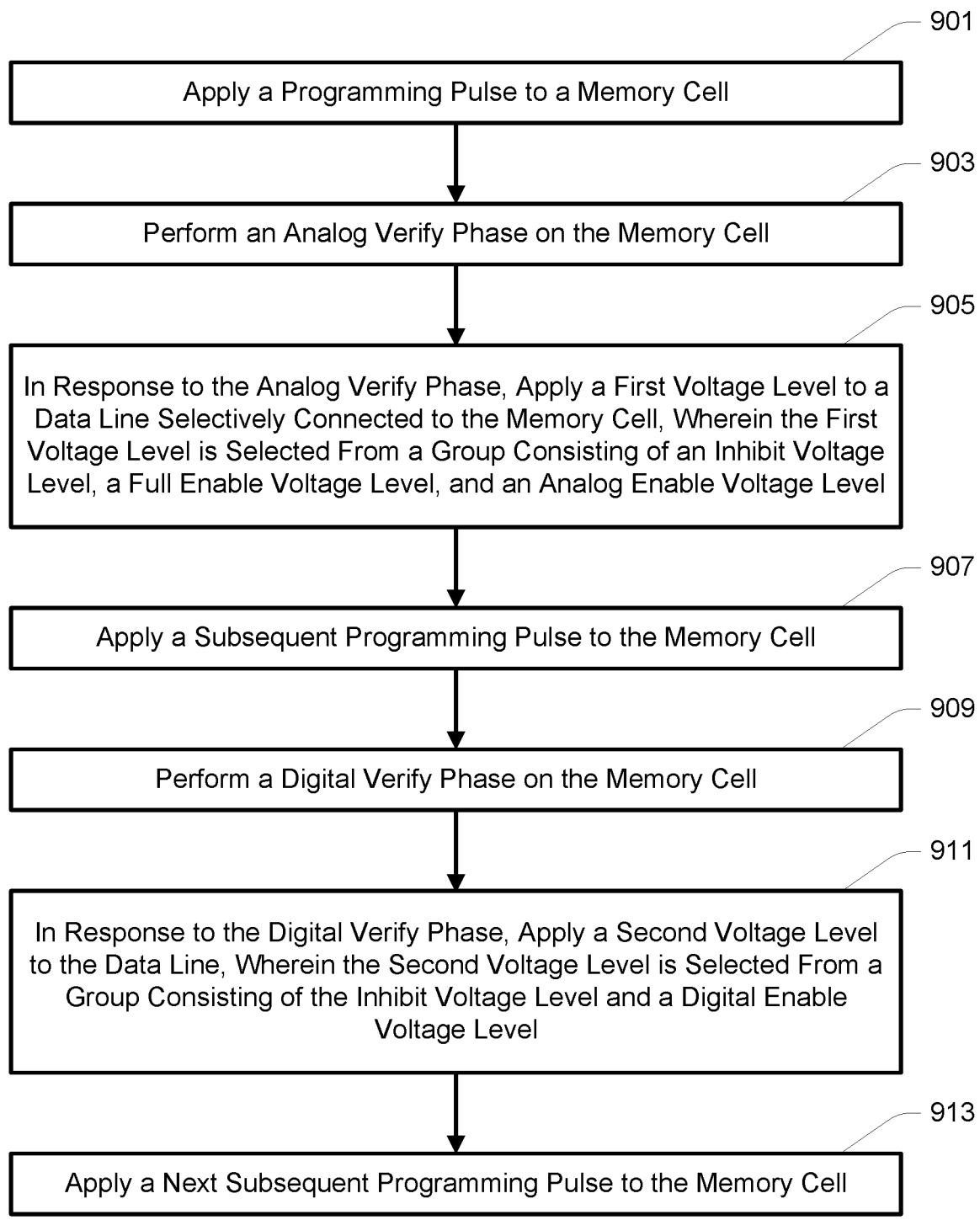
FIG. 9 depicts a flowchart of a method of operating a memory in accordance with an embodiment.

FIG. 9 depicts a flowchart of a method of operating a memory in accordance with an embodiment. The method might represent actions associated with a programming operation, e.g., portions of programming phases, an analog verify phase, and a digital verify phase, performed by the memory. The method might be in the form of computer-readable instructions, e.g., stored to the instruction registers 128. Such computer-readable instructions might be executed by a controller, e.g., the control logic 116, to cause the relevant components of the memory to perform the method.

At 901, a programming pulse of the programming operation might be applied to a memory cell. For example, the memory cell might have a control gate connected to a selected access line for a programming operation, e.g., the access line to receive the programming pulse during the programming operation.

At 903, an analog verify phase of the programming operation might be performed on the memory cell, e.g., it might be the focus of an analog verification. For some embodiments, the memory cell might have an intended data state equal to any of the data states L1-L7 in the example of FIG. 3A, or any of the data states L1-L15 in the example of FIG. 3B.

The analog verify phase might determine whether the memory cell is deemed to have a threshold voltage higher than (e.g., higher than or equal to) a first threshold, or whether the memory cell is deemed to have a threshold voltage lower than (e.g., lower than or equal to) a second threshold lower than the first threshold. The first threshold might correspond to a lower voltage level of a desired threshold voltage distribution for the intended data state of the memory cell.

At 905, in response to the analog verify phase, a first voltage level might be applied to a data line selectively connected to the memory cell. The first voltage level might be selected from a group consisting of an inhibit voltage level, a full enable voltage level, and an analog enable voltage level. The inhibit voltage level might be a highest voltage level applied to a data line selectively connected to a memory cell selected for the programming operation during a subsequent programming pulse or during the programming operation. The full enable voltage level might be a lowest voltage level applied to a data line selectively connected to a memory cell selected for the programming operation during a subsequent programming pulse or during the programming operation. The analog enable voltage level might be inversely proportional to a level of activation of the memory cell during the analog verify phase. The analog enable voltage level might be generated in response to a voltage level of a node of the page buffer circuit selectively connected to the data line during the analog verify phase.

The voltage level of the node might be indicative of the level of activation of the memory cell during the analog verify phase. The voltage level of the node might be applied to a control gate of a transistor configured as a source-follower to generate the analog enable voltage level at a source/drain of the transistor.

The first voltage level might be the inhibit voltage level in response to determining that the memory cell is deemed to have a threshold voltage higher than (e.g., higher than or equal to) the first threshold, and might be the full enable voltage level in response to determining that the memory cell is deemed to have a threshold voltage lower than (e.g., lower than or equal to) the second threshold. Otherwise, the first voltage level might be the analog enable voltage level in response to not satisfying either condition, e.g., neither being deemed to have a threshold voltage higher than (e.g., higher than or equal to) the first threshold, nor being deemed to have a threshold voltage lower than (e.g., lower than or equal to) the second threshold.

At 907, a subsequent programming pulse might be applied to the memory cell, e.g., while its corresponding data line receives the first voltage level. The subsequent programming pulse might have a voltage level higher than the programming pulse. The voltage level of the subsequent programming pulse might be determined in response to the analog verify phase, e.g., a VgVt determination for memory cell selected for the programming operation might be performed as previously described. Alternatively, the subsequent programming pulse might be a predetermined amount higher than the programming pulse. The subsequent programming pulse might be expected to move the threshold voltage of the memory cell near or within a desired threshold voltage distribution for its intended data state.

At 909, a digital verify phase of the programming operation might be performed on the memory cell, e.g., it might be the focus of a digital verification. The digital verify phase might determine whether the memory cell is deemed to have a threshold voltage higher than (e.g., higher than or equal to) a third threshold, or whether the memory cell is deemed to have a threshold voltage lower than (e.g., lower than or equal to) the third threshold. The third threshold might correspond to a lower voltage level of a desired threshold voltage distribution for the intended data state of the memory cell, e.g., the third threshold might be equal to the first threshold. However, the third threshold might be different than (e.g., higher than) the first threshold. For example, a lower threshold could be used for the analog verify phase to reduce the resulting width of the threshold voltage distribution.

At 911, in response to the digital verify phase, a second voltage level might be applied to the data line. The second voltage level might be selected from a group consisting of the inhibit voltage level and a digital enable voltage level. The inhibit voltage level might be a highest voltage level applied to a data line selectively connected to a memory cell selected for the programming operation during a next subsequent programming pulse. The full enable voltage level might be a lowest voltage level applied to a data line selectively connected to a memory cell selected for the programming operation during a next subsequent programming pulse or during the programming operation. The digital enable voltage level might be predetermined and might be lower than the inhibit voltage level and higher than or equal to the full enable voltage level.

At 913, a next subsequent programming pulse might be applied to the memory cell, e.g., while its corresponding data line receives the second voltage level. The next subsequent programming pulse might have a voltage level higher than the subsequent programming pulse. The voltage level of the next subsequent programming pulse might be determined in response to an analog verify phase performed on other memory cells, e.g., a VgVt determination for other memory cells selected for the programming operation might be performed as previously described. Alternatively, the next subsequent programming pulse might be a predetermined amount higher than the subsequent programming pulse. The next subsequent programming pulse might be expected to move the threshold voltage of the memory cell within the desired threshold voltage distribution for its intended data state if it is not already within that range of threshold voltages.

Note that the memory cell might be enabled (e.g., fully enabled) for programming during the programming pulse and during any prior programming pulse or pulses of the programming operation. Conversely, the memory cell might be inhibited from programming during any remaining programming pulse or pulses of the programming operation following the next subsequent programming pulse.

Figure 10:
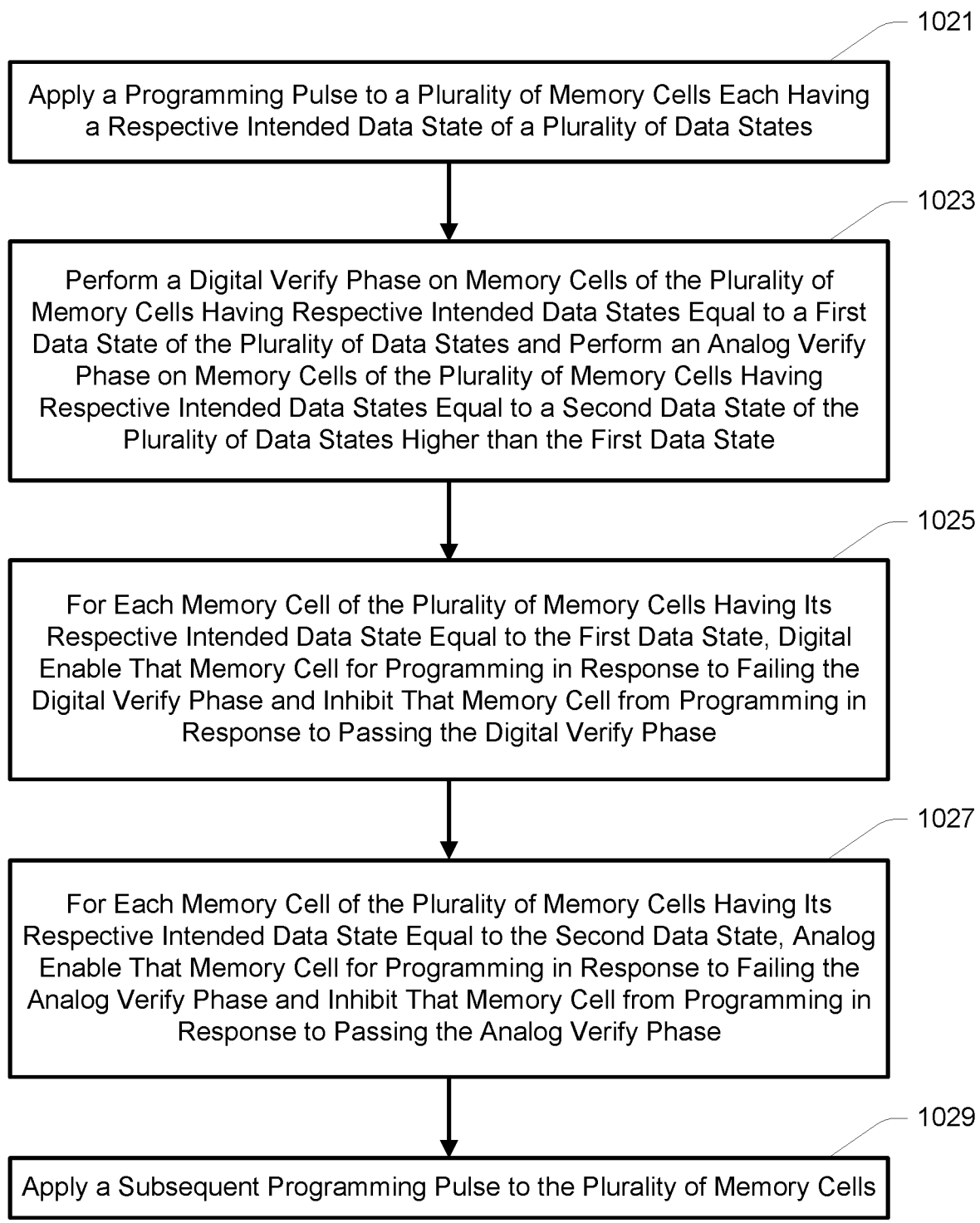
FIG. 10 depicts a flowchart of a method of operating a memory in accordance with another embodiment.

FIG. 10 depicts a flowchart of a method of operating a memory in accordance with another embodiment. The method might represent actions associated with a programming operation, e.g., portions of a programming phase, a digital verify phase, an analog verify phase, and a subsequent programming phase of the programming operation, performed by the memory. The method might be in the form of computer-readable instructions, e.g., stored to the instruction registers 128. Such computer-readable instructions might be executed by a controller, e.g., the control logic 116, to cause the relevant components of the memory to perform the method.

At 1021, a programming pulse of the programming operation might be applied to a plurality of memory cells each having a respective intended data state of a plurality of data states. For example, the plurality of memory cells might represent memory cells having control gates connected to a selected access line for a programming operation, e.g., the access line to receive the programming pulse during the programming operation. As noted, some memory cells having control gates connected to a selected access line might not be the subject of a programming operation, and thus would not have respective intended data states. Such memory cells might remain inhibited from programming for the process of FIG. 10. For purposes of discussing FIG. 10, the data states of FIG. 3A, e.g., eight data states, will be used as an example, and reference will be made to FIG. 6. For example, the programming pulse might correspond to any one of the programming pulses $602_1$-$602_6$.

At 1023, a digital verify phase of the programming operation might be performed on memory cells of the plurality of memory cells having respective intended data states equal to a first data state of the plurality of data states, e.g., they might be the focus of a digital verification, and an analog verify phase of the programming operation might be performed on memory cells of the plurality of memory cells having respective intended data states equal to a second data state of the plurality of data states higher than the first data state, e.g., they might be the focus of an analog verification. The second data state might be the next higher data state than the first data state. Continuing with the example of TLC memory, the first data state might be any of the data states L1-L6, while the second data state might be any of the data states L2-L7, respectively. For example, if the programming pulse corresponds to the programming pulse $602_1$ of FIG. 6, the first data state might be the L1 data state and the second data state might be the L2 data state.

Note that the programming pulse at 1021 might not be an initial programming pulse of the programming operation. For example, if the programming pulse corresponds to the programming pulse $602_1$ of FIG. 6, a prior analog verify phase might be performed on the memory cells of the plurality of memory cells having respective intended data states equal to the first data state prior to applying the programming pulse, and a prior programming pulse, e.g., the programming pulse $602_0$ in this example, might be applied before the prior analog verify phase is performed on the memory cells of the plurality of memory cells having respective intended data states equal to the first data state.

At 1025, each memory cell of the plurality of memory cells having its respective intended data state equal to the first data state might be either digital enabled for programming or inhibited from programming in response to the digital verify phase. For example, such a memory cell might be digital enabled for programming in response to failing the digital verify phase, e.g., the digital enable voltage level lower than the inhibit voltage level and higher than the full enable voltage level might be applied to its corresponding data line. A memory cell will be deemed to fail a digital verification in response to being deemed to have a threshold voltage level lower than the desired threshold voltage distribution of its intended data state while being the focus of the digital verification. Such a memory cell might alternately be inhibited from programming in response to passing the digital verify phase, e.g., the inhibit voltage level might be applied to its corresponding data line. A memory cell will be deemed to pass a digital verification in response to being deemed to have a threshold voltage level within the desired threshold voltage distribution of its intended data state while being the focus of the digital verification.

At 1027, each memory cell of the plurality of memory cells having its respective intended data state equal to the second data state might be either analog enabled for programming or inhibited from programming in response to the analog verify phase. For example, such a memory cell might be analog enabled for programming in response to failing the digital verify phase, e.g., an analog enable voltage level lower than the inhibit voltage level and higher than or equal to the full enable voltage level might be applied to its corresponding data line. A memory cell will be deemed to fail an analog verification in response to being deemed to have a threshold voltage level lower than the desired threshold voltage distribution of its intended data state while being the focus of the analog verification. Such a memory cell might alternately be inhibited from programming in response to passing the analog verify phase, e.g., the inhibit voltage level might be applied to its corresponding data line. A memory cell will be deemed to pass an analog verification in response to being deemed to have a threshold voltage level within the desired threshold voltage distribution of its intended data state while being the focus of the analog verification.

Optionally, memory cells of the plurality of memory cells having respective intended data states lower than the first data state might be inhibited from programming, e.g., the inhibit voltage level might be applied to their corresponding data lines. These memory cells might be inhibited from programming without regard to any verification performed. Similarly, memory cells of the plurality of memory cells having respective intended data states higher than the second data state might be enabled, e.g., fully enabled, for programming, e.g., the full enable voltage level might be applied to their corresponding data lines. These memory cells might be enabled for programming without regard to any verification performed.

At 1029, a subsequent programming pulse might be applied to the plurality of memory cells. The subsequent programming pulse might have a voltage level higher than the programming pulse. The voltage level of the subsequent programming pulse might be determined in response to the analog verify phase, e.g., a VgVt determination for memory cells of the plurality of memory cells having respective intended data states equal to the second data state might be performed as previously described.

Digital enabling memory cells of the plurality of memory cells for programming involves applying a predetermined voltage level to each of their corresponding data lines. The predetermined voltage level might be the same for each of the data lines corresponding to memory cells to be digital enabled for programming. Analog enabling memory cells of the plurality of memory cells for programming involves applying a respective voltage level to each of their corresponding data lines. The respective voltage level for a particular data line corresponding to a memory cell to be analog enabled for programming might be independent of, e.g., different than, the respective voltage level for a different data line corresponding to a different memory cell to be analog enabled for programming. For each data line corresponding to a memory cell to be analog enabled for programming, its respective voltage level might be generally proportional, e.g., inversely proportional, to the level of activation of its corresponding memory cell during the analog verify phase, such that higher levels of activation of memory cells during the analog verify phase lead to lower data line voltage levels for their corresponding data lines for the subsequent programming pulse. Note that this relationship might be limited in that an analog enable voltage level might be restricted to voltage levels higher than or equal to the full enable voltage level, and lower than the inhibit voltage level.

The process of FIG. 10 might be useful in tightening a threshold voltage distribution for memory cells of the plurality of memory cells having respective intended data states equal to the first data state, and moving memory cells of the plurality of memory cells having respective intended data states equal to the second data state nearer or within their desired threshold voltage distribution.

Note that the subsequent programming pulse at 1029 might not be a final programming pulse of the programming operation. For example, if the subsequent programming pulse corresponds to the programming pulse $602_7$ of FIG. 6, a subsequent digital verify phase might be performed on the memory cells of the plurality of memory cells having respective intended data states equal to the second data state, e.g., they might be the focus of a subsequent digital verification, after applying the subsequent programming pulse, and a next subsequent programming pulse, e.g., the programming pulse $602_8$ in this example, might be applied after the subsequent digital verification of the memory cells of the plurality of memory cells having respective intended data states equal to the second data state.

Figure 11A:
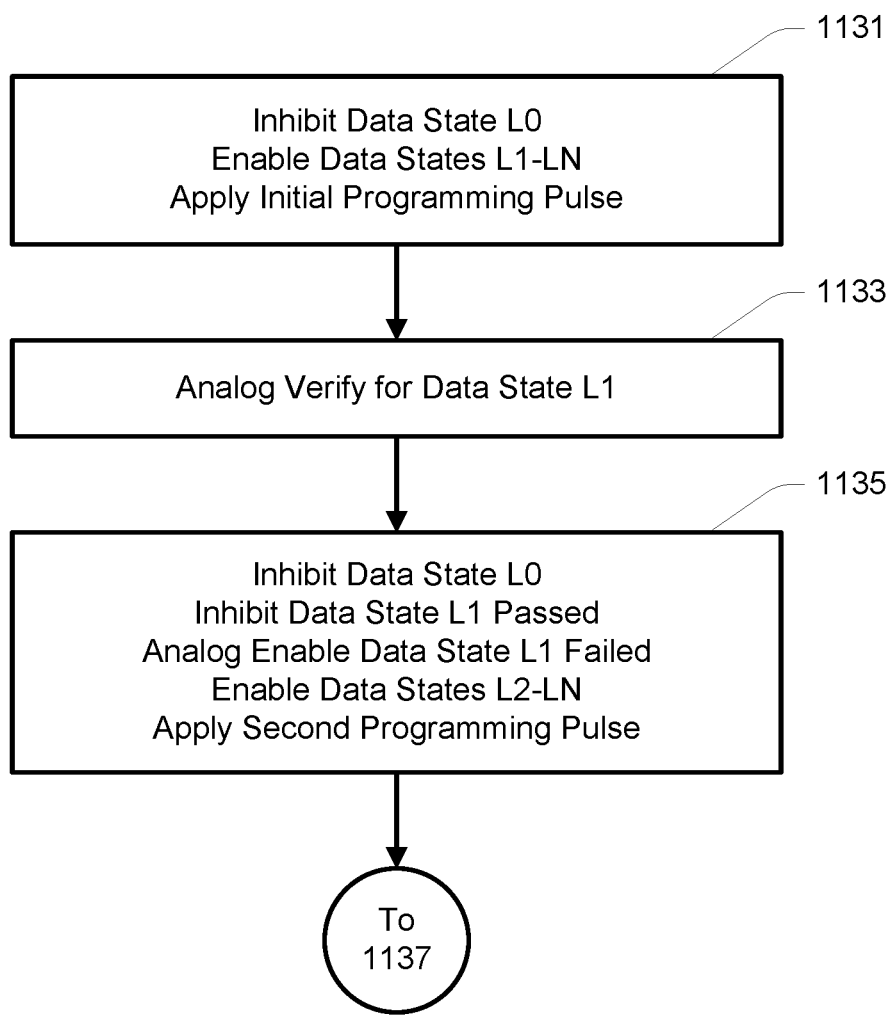
FIGS. 11A-11C collectively depict a flowchart of a method of operating a memory in accordance with a further embodiment.
Figure 11B:
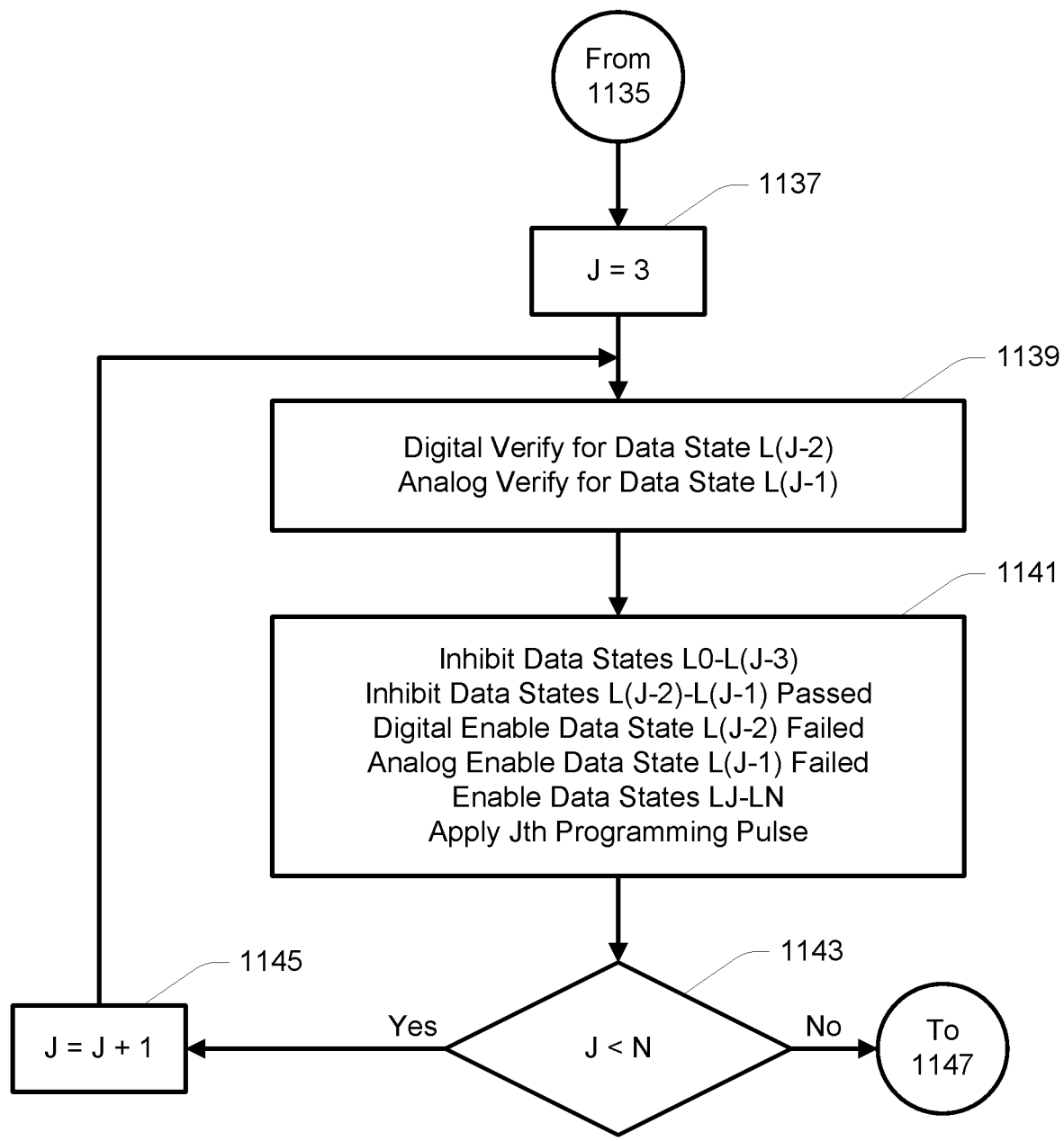
Figure 11C:
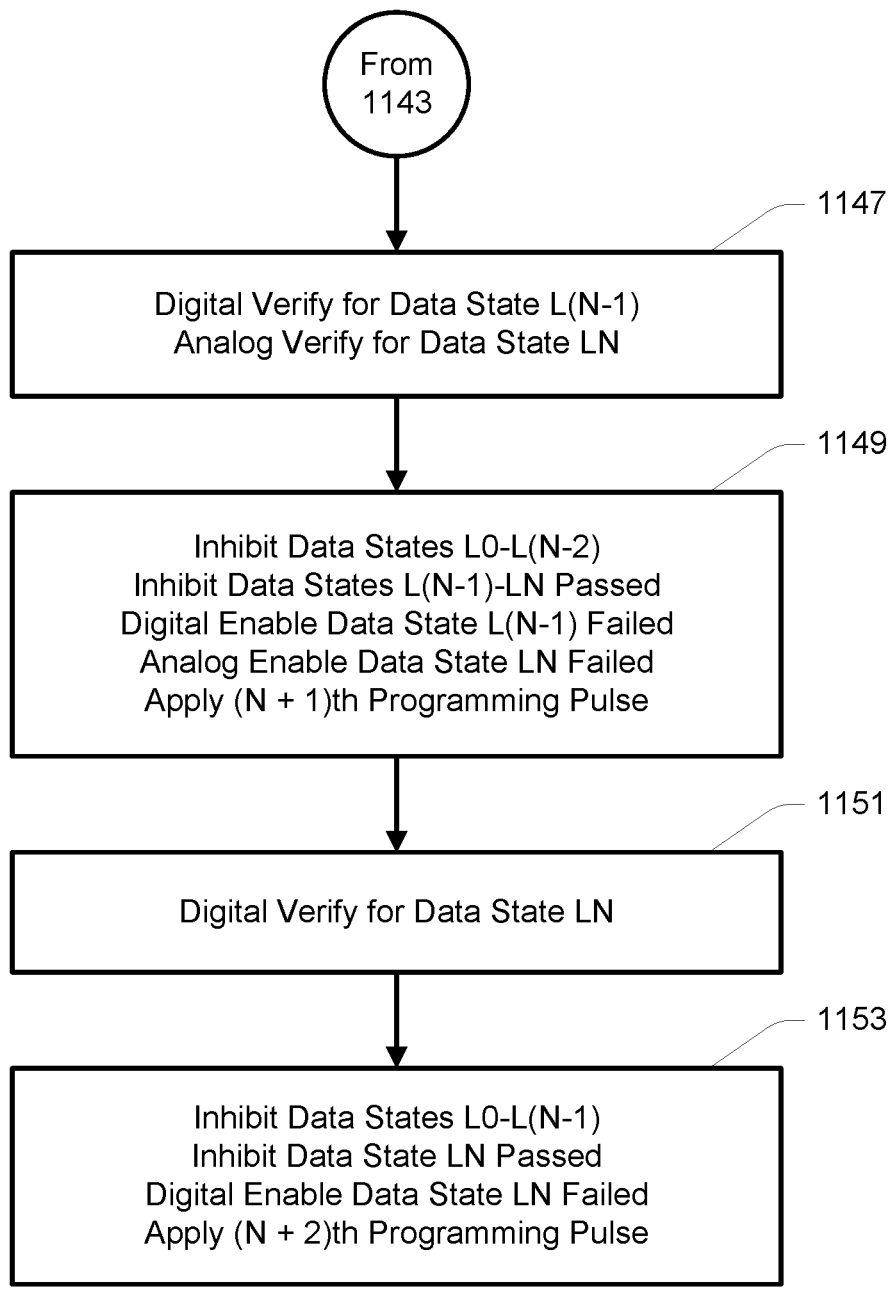

FIGS. 11A-11C collectively depict a flowchart of a method of operating a memory in accordance with a further embodiment. The method might represent actions associated with a programming operation, e.g., programming phases, digital verify phases, and analog verify phases of the programming operation, performed by the memory. The method might be in the form of computer-readable instructions, e.g., stored to the instruction registers 128. Such computer-readable instructions might be executed by a controller, e.g., the control logic 116, to cause the relevant components of the memory to perform the method.

For purposes of discussing FIGS. 11A-11C, the data states of FIG. 3A, e.g., eight data states, will be used as an example, and reference will be made to FIG. 6. For example, the initial programming pulse might correspond to the programming pulses $602_1$, and N might equal 7. While N=7 in the example, the process of FIGS. 11A-11C might apply to any integer value of N greater than or equal to 3. Due to the nature of binary data processing, N+1 might typically have a value that is some power of 2, such that N might tend to have a value satisfying the equation $N=2^X-1$, where X is any integer value greater than or equal to 2.

At 1131, memory cells of a plurality of memory cells having the data state L0, e.g., the initial data state, as their intended data state, e.g., L0 memory cells, might be inhibited from programming, and memory cells of the plurality of memory cells having any of the data states L1-LN as their intended data state, e.g., L1-LN memory cells, might be enabled, e.g., fully enabled, for programming. For example, the data lines corresponding to the L0 memory cells might receive the inhibit voltage level and the data lines corresponding to the L1-LN memory cells might receive the full enable voltage level.

The plurality of memory cells might represent memory cells having control gates connected to a selected access line for a programming operation. As noted, some memory cells having control gates connected to a selected access line might not be the subject of a programming operation, and thus would not have respective intended data states. Such memory cells might remain inhibited from programming for the process of FIGS. 11A-11C. While fully enabling the L1-LN memory cells for programming is expected to provide efficiencies in programming, these memory cells could alternatively be less than fully enabled for programming. An initial programming pulse of the programming operation might be applied to the plurality of memory cells while the L0 memory cells are inhibited from programming and while the L1-LN memory cells are enabled, e.g., fully enabled, for programming.

At 1133, memory cells of the plurality of memory cells having the second data state L1 as their intended data state, e.g., L1 memory cells, might be analog verified. The analog verification might determine which of the L1 memory cells passed or failed the analog verification. A memory cell will be deemed to pass an analog verification in response to being deemed to have a threshold voltage level within the desired threshold voltage distribution of its intended data state while being the focus of the analog verification. A memory cell will be deemed to fail an analog verification in response to being deemed to have a threshold voltage level lower than the desired threshold voltage distribution of its intended data state while being the focus of the analog verification. For example, an L1 memory cell might be deemed to pass the analog verification if the sense transistor 451 is activated in response to the voltage level of the tc node 432 between times t8 and t9 of the analog verification of FIG. 8A. Similarly, an L1 memory cell might be deemed to fail the analog verification if the sense transistor 451 is deactivated between times t6 and t7, or deactivated between times t8 and t9, of the analog verification of FIG. 8A.

At 1135, the L0 memory cells, and the L1 memory cells that passed the analog verification, might be inhibited from programming. For example, data lines corresponding to the L0 memory cells, and data lines corresponding to the L1 memory cells that passed the analog verification, might receive the inhibit voltage level. The L1 memory cells that failed the analog verification might be analog enabled for programming. For example, data lines corresponding to the L1 memory cells that failed the analog verification might receive a voltage level lower than the inhibit voltage level and higher than or equal to the full enable voltage level. Memory cells of the plurality of memory cells having any of the data states L2-LN as their intended data state, e.g., L2-LN memory cells, might be enabled, e.g., fully enabled, for programming. For example, data lines corresponding to the L2-LN memory cells might receive the full enable voltage level. While fully enabling the L2-LN memory cells for programming is expected to provide efficiencies in programming, these memory cells could alternatively be less than fully enabled for programming. A second programming pulse of the programming operation might be applied to the plurality of memory cells while the L0 memory cells are inhibited from programming, while the L1 memory cells that passed the analog verification are inhibited from programming, while the L1 memory cells that failed the analog verification are analog enabled for programming, and while the L2-LN memory cells are enabled, e.g., fully enabled, for programming.

At 1137, a value of an integer J might equal 3. The process of 1139 to 1141 might be repeated for values of J satisfying the relationship 3<=J<=N. At 1139, memory cells of the plurality of memory cells having the data state L(J−2) as their intended data state, e.g., L(J−2) memory cells, might be digital verified, e.g., might be the focus of a digital verification, while memory cells of the plurality of memory cells having the data state L(J−1) as their intended data state, e.g., L(J−1) memory cells, might be analog verified, e.g., might be the focus of an analog verification. The digital verification of the L(J−2) memory cells might determine which of the L(J−2) memory cells passed or failed the digital verification. A memory cell will be deemed to pass a digital verification in response to being deemed to have a threshold voltage level within the desired threshold voltage distribution of its intended data state while being the focus of the digital verification. A memory cell will be deemed to fail a digital verification in response to being deemed to have a threshold voltage level lower than the desired threshold voltage distribution of its intended data state while being the focus of the digital verification. For example, an L(J−2) memory cell might be deemed to pass the digital verification if the sense transistor 451 is activated in response to the voltage level of the tc node 432 between times t5 and t6 of the digital verification of FIG. 8B. Similarly, an L(J−2) memory cell might be deemed to fail the digital verification if the sense transistor 451 is deactivated between times t5 and t6 of the digital verification of FIG. 8B. The analog verification might determine which of the L(J−1) memory cells passed or failed the analog verification.

At 1141, the L0-L(J−3) memory cells, the L(J−2) memory cells that passed the digital verification, and the L(J−1) memory cells that passed the analog verification, might be inhibited from programming. For example, data lines corresponding to the L0-L(J−3) memory cells, data lines corresponding to the L(J−2) memory cells that passed the digital verification, and data lines corresponding to the L(J−1) memory cells that passed the analog verification, might receive the inhibit voltage level. The L(J−2) memory cells that failed the digital verification might be digital enabled for programming. For example, data lines corresponding to the L(J−2) memory cells that failed the digital verification might receive a digital enable voltage level, which might be a predetermined voltage level lower than the inhibit voltage level and higher than or equal to the full enable voltage level. The L(J−1) memory cells that failed the analog verification might be analog enabled for programming. For example, data lines corresponding to the L1 memory cells that failed the analog verification might receive a respective analog enable voltage level, which might be a voltage level lower than the inhibit voltage level and higher than or equal to the full enable voltage level. While the digital enable voltage level might be the same voltage level for each data line corresponding to an L(J−2) memory cell that failed the digital verification, the respective analog voltage level for one L(J−1) memory cell that failed the analog verification might be independent of the respective analog enable voltage level for each remaining L(J−1) memory cell that failed the analog verification, e.g., their voltage levels might be different.

Memory cells of the plurality of memory cells having any of the data states LJ-LN as their intended data state, e.g., LJ-LN memory cells, might be enabled, e.g., fully enabled, for programming. For example, data lines corresponding to the LJ-LN memory cells might receive the full enable voltage level. While fully enabling the LJ-LN memory cells for programming is expected to provide efficiencies in programming, these memory cells could alternatively be less than fully enabled for programming. A Jth programming pulse of the programming operation might be applied to the plurality of memory cells while the L0-L(J−3) memory cells are inhibited from programming, while the L(J−2) memory cells that passed the digital verification are inhibited from programming, while the L(J−1) memory cells that passed the analog verification are inhibited from programming, while the L(J−2) memory cells that failed the digital verification are digital enabled for programming, while the L(J−1) memory cells that failed the analog verification are analog enabled for programming, and while the LJ-LN memory cells are enabled, e.g., fully enabled, for programming.

At 1143, it might be determined whether J<N. If J<N, the value of J might be incremented by 1 at 1145, and the process might return to 1139. If J=N, the process might proceed to 1147. At 1147, memory cells of the plurality of memory cells having the data state L(N−1) as their intended data state, e.g., L(N−1) memory cells, might be digital verified, e.g., might be the focus of a digital verification, while memory cells of the plurality of memory cells having the data state LN as their intended data state, e.g., LN) memory cells, might be analog verified, e.g., might be the focus of an analog verification. The digital verification of the L(N−1) memory cells might determine which of the L(N−1) memory cells passed or failed the digital verification. The analog verification might determine which of the LN memory cells passed or failed the analog verification.

At 1149, the L0-L(N−2) memory cells, the L(N−1) memory cells that passed the digital verification, and the LN memory cells that passed the analog verification, might be inhibited from programming. For example, data lines corresponding to the L0-L(N−2) memory cells, data lines corresponding to the L(N−1) memory cells that passed the digital verification, and data lines corresponding to the LN memory cells that passed the analog verification, might receive the inhibit voltage level. The L(N−1) memory cells that failed the digital verification might be digital enabled for programming. The LN memory cells that failed the analog verification might be analog enabled for programming. An (N+1)th programming pulse of the programming operation might be applied to the plurality of memory cells while the L0-L(N−2) memory cells are inhibited from programming, while the L(N−1) memory cells that passed the digital verification are inhibited from programming, while the LN memory cells that passed the analog verification are inhibited from programming, while the L(N−1) memory cells that failed the digital verification are digital enabled for programming, and while the LN memory cells that failed the analog verification are analog enabled for programming.

At 1151, the LN memory cells might be digital verified, e.g., might be the focus of a digital verification. The digital verification of the LN memory cells might determine which of the LN memory cells passed or failed the digital verification. At 1153, the L0-L(N−1) memory cells, and the L(N−1) memory cells that passed the digital verification, might be inhibited from programming. For example, data lines corresponding to the L0-L(N−1) memory cells, and data lines corresponding to the LN memory cells that passed the digital verification, might receive the inhibit voltage level. The LN memory cells that failed the digital verification might be digital enabled for programming. An (N+2)th programming pulse of the programming operation might be applied to the plurality of memory cells while the L0-L(N−1) memory cells are inhibited from programming, while the LN memory cells that passed the digital verification are inhibited from programming, and while the LN memory cells that failed the digital verification are digital enabled for programming.

CONCLUSION

Although specific embodiments have been illustrated and described herein, it will be appreciated by those of ordinary skill in the art that any arrangement that is calculated to achieve the same purpose might be substituted for the specific embodiments shown. Many adaptations of the embodiments will be apparent to those of ordinary skill in the art. Accordingly, this application is intended to cover any adaptations or variations of the embodiments.

What is claimed is:

1. A memory, comprising:
   an array of memory cells comprising a plurality of memory cells;
   a plurality of data lines, wherein each data line corresponds to a respective memory cell of the plurality of memory cells; and
   a controller for access of the array of memory cells, wherein, during a programming operation on the plurality of memory cells, the controller is configured to cause the memory to:
   apply a programming pulse to a memory cell of the plurality of memory cells;
   perform an analog verify phase on the memory cell;
   in response to the analog verify phase, apply a first voltage level to the corresponding data line of the memory cell, wherein the first voltage level is selected from a group consisting of an inhibit voltage level, a full enable voltage level, and an analog enable voltage level;
   apply a subsequent programming pulse to the memory cell;
   perform a digital verify phase on the memory cell;
   in response to the digital verify phase, apply a second voltage level to the corresponding data line of the memory cell, wherein the second voltage level is selected from a group consisting of the inhibit voltage level and a digital enable voltage level; and
   apply a next subsequent programming pulse to the memory cell.

2. The memory of claim 1, wherein the inhibit voltage level is a highest voltage level applied to any data line of the plurality of data lines during the programming operation, and wherein the full enable voltage level is a lowest voltage level applied to any data line of the plurality of data lines during the programming operation.

3. The memory of claim 1, wherein the analog enable voltage level is inversely proportional to a level of activation of the memory cell during the analog verify phase.

4. The memory of claim 3, wherein the analog enable voltage level is generated in response to a voltage level of a node of a page buffer circuit selectively connected to the data line corresponding to the memory cell during the analog verify phase.

5. The memory of claim 4, wherein the controller is further configured to cause the memory to apply the voltage level of the node to a control gate of a transistor configured as a source-follower to generate the analog enable voltage level at a source/drain of the transistor.

6. The memory of claim 1, wherein the controller is configured to cause the memory to apply the first voltage level to the data line corresponding to the memory cell having the inhibit voltage level in response to determining that the memory cell is deemed to have a threshold voltage higher than or equal to a first threshold during the analog verify phase, and is configured to cause the memory to apply the first voltage level to the data line corresponding to the memory cell having the full enable voltage level in response to determining that the memory cell is deemed to have a threshold voltage lower than a second threshold that is lower than the first threshold during the analog verify phase.

7. The memory of claim 6, wherein the controller is configured to cause the memory to apply the first voltage level to the data line corresponding to the memory cell having the analog enable voltage level in response to determining that the memory cell is not deemed to have a threshold voltage higher than or equal to the first threshold during the analog verify phase, and is not deemed to have a threshold voltage lower than the second threshold during the analog verify phase.

8. A memory, comprising:
   an array of memory cells comprising a plurality of memory cells;
   a plurality of data lines, wherein each data line corresponds to a respective memory cell of the plurality of memory cells; and
   a controller for access of the array of memory cells, wherein the controller is configured to cause the memory to:
   apply a programming pulse to the plurality of memory cells, wherein each memory cell of the plurality of memory cells has a respective intended data state of a plurality of data states;
   perform a digital verify phase on memory cells of the plurality of memory cells having intended data states equal to a first data state of the plurality of data states and perform an analog verify phase on memory cells of the plurality of memory cells having intended data states equal to a second data state of the plurality of data states higher than the first data state;
   for each memory cell of the plurality of memory cells having its respective intended data state equal to the first data state, digital enable that memory cell for programming in response to failing the digital verify phase and inhibit that memory cell from programming in response to passing the digital verify phase;
   for each memory cell of the plurality of memory cells having its respective intended data state equal to the second data state, analog enable that memory cell for programming in response to failing the analog verify phase and inhibit that memory cell from programming in response to passing the analog verify phase; and
   apply a subsequent programming pulse to the plurality of memory cells.

9. The memory of claim 8, wherein the controller being configured to cause the memory to digital enable each memory cell of the plurality of memory cells having its respective intended data state equal to the first data state that failed the digital verify phase comprises the controller being configured to cause the memory to apply a digital enable voltage level to the corresponding data line of each memory cell of the plurality of memory cells having its respective intended data state equal to the first data state that failed the digital verify phase.

10. The memory cell of claim 9, wherein the digital enable voltage level is set to a voltage level expected to increase a threshold voltage of a digital enabled memory cell by an amount less than a desired state width of the first data state.

11. The memory of claim 10, further comprising wherein the digital enable voltage level is further set to a voltage level expected to increase the threshold voltage of the digital enabled memory cell by an amount greater than or equal to 50% of the desired state width of the first data state.

12. The memory of claim 8, wherein the controller being configured to cause the memory to analog enable each memory cell of the plurality of memory cells having its respective intended data state equal to the second data state that failed the analog verify phase comprises the controller being configured to cause the memory to apply a respective analog enable voltage level to the corresponding data line of each memory cell of the plurality of memory cells having its respective intended data state equal to the second data state that failed the analog verify phase.

13. The memory of claim 12, wherein the respective analog enable voltage level for the corresponding data line of a particular memory cell of the plurality of memory cells having its respective intended data state equal to the second data state that failed the analog verify phase is independent of the respective analog enable voltage level for the corresponding data line of each remaining memory cell of the plurality of memory cells having its respective intended data state equal to the second data state that failed the analog verify phase.

14. The memory of claim 8, wherein the controller is further configured to cause the memory to:
   prior to applying the programming pulse to the plurality of memory cells:
      apply a prior programming pulse to the plurality of memory cells;
      perform a prior analog verify phase on the memory cells of the plurality of memory cells having intended data states equal to the first data state; and
      for each memory cell of the plurality of memory cells having its respective intended data state equal to the first data state, analog enable that memory cell for programming in response to failing the prior analog verify phase and inhibit that memory cell from programming in response to passing the prior analog verify phase.

15. The memory of claim 8, wherein the controller is further configured to cause the memory to:
  after applying the subsequent programming pulse to the plurality of memory cells:
    perform a subsequent digital verify phase on the memory cells of the plurality of memory cells having intended data states equal to the second data state;
    for each memory cell of the plurality of memory cells having its respective intended data state equal to the second data state, digital enable that memory cell for programming in response to failing the subsequent digital verify phase and inhibit that memory cell from programming in response to passing the subsequent digital verify phase; and
    apply a next subsequent programming pulse to the plurality of memory cells.

16. A memory, comprising:
  an array of memory cells comprising a plurality of memory cells, wherein each memory cell of the plurality of memory cells has a respective intended data state of N+1 data states for a programming operation, and wherein the N+1 data states comprises an initial data state and N remaining data states;
  a plurality of data lines, wherein each data line corresponds to a respective memory cell of the plurality of memory cells; and
  a controller for access of the array of memory cells, wherein, during a programming operation on the plurality of memory cells, the controller is configured to cause the memory to:
    for each memory cell of the plurality of memory cells having its respective intended data state equal to the initial data state, inhibit that memory cell from programming;
    for each memory cell of the plurality of memory cells having its respective intended data state equal to any data state of the remaining N data states, fully enable that memory cell for programming;
    apply a first programming pulse to the plurality of memory cells;
    for each integer value of J from 1 to N:
      perform a Jth analog verify phase on each memory cell of the plurality of memory cells having its respective intended data state equal to a Jth data state of the remaining N data states;
      for each memory cell of the plurality of memory cells having its respective intended data state equal to the initial data state, inhibit that memory cell from programming;
      for each memory cell of the plurality of memory cells having its respective intended data state lower than the (J−1)th data state of the remaining N data states for integer values of J greater than two, inhibit that memory cell from programming;
      for each memory cell of the plurality of memory cells having its respective intended data state equal to the Jth data state of the remaining N data states, inhibit that memory cell from programming in response to passing the Jth analog verify phase and analog enable that memory cell for programming in response to failing the Jth analog verify phase;
      for each memory cell of the plurality of memory cells having its respective intended data state higher than the Jth data state of the remaining N data states, fully enable that memory cell for programming;
      apply a (J+1)th programming pulse to each memory cell of the plurality of memory cells;
      perform a Jth digital verify phase on each memory cell of the plurality of memory cells having its respective intended data state equal to the Jth data state; and
      for each memory cell of the plurality of memory cells having its respective intended data state equal to the Jth data state of the remaining N data states, inhibit that memory cell from programming in response to passing the Jth digital verify phase and digital enable that memory cell for programming in response to failing the Jth digital verify phase; and
    apply an (N+2)th programming pulse to each memory cell of the plurality of memory cells.

17. The memory of claim 16, wherein inhibiting a memory cell from programming comprises applying an inhibit voltage level to the corresponding data line of that memory cell, wherein the inhibit voltage level is a highest voltage level applied to any data line of the plurality of data lines during the programming operation, wherein fully enabling the memory cell for programming comprises applying a full enable voltage level to the corresponding data line of that memory cell, wherein the full enable voltage level is a lowest voltage level applied to any data line of the plurality of data lines during the programming operation, wherein analog enabling the memory cell for programming comprises applying a respective analog enable voltage level to the corresponding data line of that memory cell, wherein the respective analog enable voltage level is inversely proportional to a level of activation of the memory cell during a corresponding analog verify phase, wherein digital enabling the memory cell for programming comprises applying a digital enable voltage level to the corresponding data line of that memory cell, and wherein the digital enable voltage level is a predetermined voltage level.

18. The memory of claim 17, wherein, in response to the memory cell being deemed to have a threshold voltage lower than a first threshold and higher than or equal to a second threshold lower than the first threshold, the respective analog enable voltage level for the memory cell is generated in response to a voltage level of a node of a page buffer circuit selectively connected to the data line corresponding to the memory cell during the corresponding analog verify phase, and wherein, in response to the memory cell being deemed to have a threshold voltage lower than the second threshold, the respective analog enable voltage level for the memory cell is the full enable voltage level.

19. The memory of claim 18, wherein the respective analog enable voltage level is lower than the inhibit voltage level and higher than or equal to the full enable voltage level.

20. The memory of claim 17, wherein the digital enable voltage level is selected to increase a threshold voltage of the memory cell by an amount less than a desired state width of its intended data state.

* * * * *